(12) United States Patent
Kalita et al.

(10) Patent No.: US 11,386,232 B2
(45) Date of Patent: Jul. 12, 2022

(54) DISTRIBUTED DATA MANAGEMENT AND VERIFICATION

(71) Applicant: The Guppy Group Inc., Fairfax, VA (US)

(72) Inventors: Sanjib Kalita, Fairfax, VA (US); Sujay Parekh, Ardsley, NY (US)

(73) Assignee: The Guppy Group Inc., Fairfax, VA (US)

( * ) Notice: Subject to any disclaimer, the term of this patent is extended or adjusted under 35 U.S.C. 154(b) by 205 days.

(21) Appl. No.: 16/210,082

(22) Filed: Dec. 5, 2018

(65) Prior Publication Data
US 2019/0171848 A1    Jun. 6, 2019

Related U.S. Application Data

(60) Provisional application No. 62/594,987, filed on Dec. 5, 2017.

(51) Int. Cl.
*G06F 21/64* (2013.01)
*G06F 16/23* (2019.01)
(Continued)

(52) U.S. Cl.
CPC .......... *G06F 21/64* (2013.01); *G06F 16/2365* (2019.01); *G06F 16/245* (2019.01);
(Continued)

(58) Field of Classification Search
CPC .... G06F 21/64; G06F 16/245; G06F 16/2365; G06F 21/602; G06F 21/6245;
(Continued)

(56) References Cited

U.S. PATENT DOCUMENTS 9,542,659 B1 *   1/2017  Stewart ............. G06F 16/24532
10,158,527 B2 * 12/2018  Anderson ........... H04L 41/0813
(Continued)

FOREIGN PATENT DOCUMENTS

CA    2367796 A1 *  7/2002  ......... G06F 21/6245
CN    110555296 A * 12/2019  ........... H04L 9/0637
(Continued)

OTHER PUBLICATIONS

Venkateswaran et al., An Electronic System for Document Verification, Sep. 20, 2011, ip.com, IPCOM000211098D, pp. 1-9. (Year: 2011).*

(Continued)

*Primary Examiner* — Peter C Shaw
(74) *Attorney, Agent, or Firm* — Condo Roccia Koptiw LLP

(57) ABSTRACT

In response to a request by a data furnisher system to add data to that organized by a system, a data coordinating system resolves the identity of counterparties to whom the data is relevant. For each identified counterparty, the coordinating system identifies a corresponding counterparty system, and via communications between smart contracts comprised in the coordinating system, communicates the data provided by the data furnisher system. The counterparty reviews the data and either verifies that it is accurate or disputes the data. The counterparty's response is communicated through the data coordinating system via the relevant smart contracts to the data furnisher system. If the counterparty verified the data, the data coordinating system updates its database to reflect the data has been verified. If the counterparty disputed the data, the data furnisher and counterparty communicate to resolve the dispute. The data is marked as being disputed.

20 Claims, 21 Drawing Sheets

(51) Int. Cl.
*G06F 21/62* (2013.01)
*H04L 9/30* (2006.01)
*H04L 9/32* (2006.01)
*G06F 21/60* (2013.01)
*G06F 16/245* (2019.01)
*H04L 9/06* (2006.01)

(52) U.S. Cl.
CPC ........ *G06F 21/602* (2013.01); *G06F 21/6245* (2013.01); *H04L 9/0637* (2013.01); *H04L 9/30* (2013.01); *H04L 9/3239* (2013.01); *H04L 9/3242* (2013.01); *H04L 2209/38* (2013.01)

(58) Field of Classification Search
CPC ....... H04L 9/0637; H04L 9/30; H04L 9/3239; H04L 9/3242; H04L 2209/38
USPC ........................................................ 713/171
See application file for complete search history.

(56) References Cited

U.S. PATENT DOCUMENTS

| | | | | |
|---|---|---|---|---|
| 10,198,325 | B2* | 2/2019 | Davis | G06F 16/9014 |
| 2006/0156418 | A1* | 7/2006 | Polozoff | H04L 63/08 726/28 |
| 2006/0218406 | A1* | 9/2006 | Kinoshita | G06F 21/80 713/182 |
| 2008/0126110 | A1* | 5/2008 | Haeberle | G06F 9/542 717/168 |
| 2015/0365361 | A1* | 12/2015 | Tomlinson | H04L 51/043 709/206 |
| 2016/0112538 | A1* | 4/2016 | Wo | G06F 21/552 709/225 |
| 2017/0076293 | A1* | 3/2017 | Cage | H04L 63/0853 |
| 2017/0337534 | A1* | 11/2017 | Goeringer | H04L 63/0428 |
| 2018/0075117 | A1* | 3/2018 | Wong | G06F 40/18 |
| 2018/0109516 | A1* | 4/2018 | Song | H04L 9/3268 |
| 2018/0349416 | A1* | 12/2018 | Circlaeys | G06F 16/48 |
| 2018/0374091 | A1* | 12/2018 | Madisetti | G06Q 20/3827 |
| 2019/0251557 | A1* | 8/2019 | Jin | G06Q 20/3827 |
| 2019/0280854 | A1* | 9/2019 | Wadhwa | H04L 9/3239 |
| 2019/0287679 | A1* | 9/2019 | Beck | G16H 50/20 |
| 2020/0133955 | A1* | 4/2020 | Padmanabhan | H04L 9/3239 |
| 2020/0175600 | A1* | 6/2020 | Mitch | H04L 9/3239 |
| 2020/0244460 | A1* | 7/2020 | Zou | H04L 9/3297 |
| 2020/0296097 | A1* | 9/2020 | Caluwaert | H04L 63/0861 |

FOREIGN PATENT DOCUMENTS

| | | | | |
|---|---|---|---|---|
| CN | 110956470 | A * | 4/2020 | G06Q 30/018 |
| CN | 111475581 | A * | 7/2020 | |
| DE | 102019217738 | A1 * | 5/2021 | |
| WO | WO-2019148248 | A1 * | 8/2019 | |
| WO | WO-2021017427 | A1 * | 2/2021 | H04L 9/0637 |

OTHER PUBLICATIONS

Ermolaev et al., "Incorruptible Auditing: Blockchain-Powered Graph Database Management", IEEE, doi: 10.1109/ICBC48266.2020. 9169431, 2020, pp. 1-3. (Year: 2020).*

Lashkari et al., "A Comprehensive Review of Blockchain Consensus Mechanisms", IEEE, doi: 10.1109/ACCESS.2021.3065880, pp. 43620-43652, 2021. (Year: 2021).*

Ding et al. "Dagbase: A Decentralized Database Platform Using DAG-Based Consensus", IEEE, doi: 10.1109/COMPSAC48688. 2020.0-164, 2020, pp. 798-807. (Year: 2020).*

Priyadharshini et al., "Data integrity in cloud storage," IEEE-International Conference On Advances In Engineering, Science And Management (ICAESM—2012), 2012, pp. 261-265. (Year: 2012).*

Mante et al., "A Study of Searchable and Auditable Attribute Based Encryption in Cloud", IEEE, doi: 10.1109/ICCES48766.2020. 9137860, 2020, pp. 1411-1415. (Year: 2020).*

Gong et al., "Research on Personal Health Data Provenance and Right Confirmation with Smart Contract", IEEE, doi: 10.1109/ IAEAC47372.2019.8997930, 2019, pp. 1211-1216. (Year: 2019).*

Liang et al., "Identity Verification and Management of Electronic Health Records with Blockchain Technology", IEEE, doi: 10.1109/ ICHI.2019.8904712, 2019, pp. 1-3. (Year: 2019).*

* cited by examiner

FIG. 20

DISTRIBUTED DATA MANAGEMENT AND VERIFICATION

CROSS REFERENCE TO RELATED APPLICATIONS

This application claims priority to U.S. Provisional Patent Application No. 62/594,987, filed Dec. 5, 2017, the contents of which are hereby incorporated herein by reference in their entirety.

BACKGROUND

Computing systems are frequently used to store and manage data. The amount of data managed by computing systems can be enormous and the data is often highly sensitive. For example, important healthcare data and personal finance data are often aggregated in electronic databases. Computing systems operated by credit bureaus contain enormous amounts of sensitive data including data relating to credit card transactions, banking cards transactions, and home and auto loan payments, to name only a few.

The data stored in these large electronic databases is typically aggregated from numerous different computing system sources. In the case of a credit bureau, data may be stored therein that has been received from numerous different banks, credit card companies, landlords, etc. Once data has been accumulated in a third-party system, the individuals to whom the data applies have little or no ability to review the data and address inaccuracies. Likewise, the individuals to whom the data applies have little or no control over the data and who may access it.

SUMMARY

Applicant discloses systems and methods for distributed data management and verification. In an example embodiment, a data coordinating system comprises a database adapted to store data and metadata about the data that is organized or managed by the system. The data coordinating system may further comprise an agent associated with each system that interacts with the coordinating system. The agents may be implemented as smart contracts. The data coordinating system is adapted to receive information identifying data that is stored on each of a plurality of separate computing systems. The data coordinating system stores metadata about the data stored on the separate computing systems including the location of the data, the counterparties about whom the data applies, and the entities that have been authorized to access data relating to the various counterparties. The data itself may continue to exist on and be maintained by the independent computing systems. In response to a request for data, the data coordinating system identifies data relevant to the request, determines whether the requesting entity is authorized to access the data, and if so, identifies the location of the data to the requesting entity.

The data coordinating system may be adapted to facilitate review and verification of data that is organized by the system. In an example embodiment, the data coordinating system is programmed to receive a request from a computing system that has data to be made accessible via the data coordinating system. The computing system, which may be referred to as a data furnisher system, has a corresponding agent or smart contract that executes on a distributed execution environment which is itself part of the data coordinating system. Alternatively, the coordinating system relies on an execution platform such as Blockchain to its execution. The data furnisher system creates a hash of the new data being furnished to the data coordinating system and uses a public key of a smart contract corresponding to the data coordinating system to encrypt the identity of the counterparty. The data furnisher system sends the hash of the new data to its corresponding smart contract on the data coordinating system and sends the encrypted counterparty identity to the smart contract corresponding to the data coordinating system.

The smart contract of the data coordinating system decrypts the counterparty identity data and resolves the counterparty in the data coordinating system. The data furnisher system obtains the identity of a smart contract maintained for the counterparty in the data coordinating system and uses a public key associated with the counterparty's identity to encrypt the data that the data furnisher system seeks to make available via the data coordinating system. The data furnisher system communicates to the smart contract of the counterparty system that the data relating to the counterparty is available for verification. The smart contract of the counterparty system notifies the counterparty system that data is available for verification.

The counterparty may use his or her system to either verify the data proposed to be added by the data furnisher system as accurate, or to dispute the data. The result of the counterparty's review is received at the smart contract maintained in the data coordinating system for the counterparty and communicated to the smart contract of the data coordinating system. If the counterparty indicated the data was verified, the data furnisher system is notified via its smart contract and the database maintained by the data coordinating system is updated to indicate the new data is verified by the relevant counterparty. If the counterparty indicated the data was disputed, the data furnisher system is notified via its smart contract. Thereafter, the data furnisher may interface directly with the counterparty to resolve the dispute. The data furnisher system may subsequently communicate to the data furnishing system any amendments to the data that were required to resolve the dispute.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the accompanying exemplary drawings. It is understood that the potential embodiments of the disclosed systems and methods are not limited to those depicted.

FIG. 20 depicts an example user interface.

DETAILED DESCRIPTION OF ILLUSTRATIVE EMBODIMENTS

Figure 1:
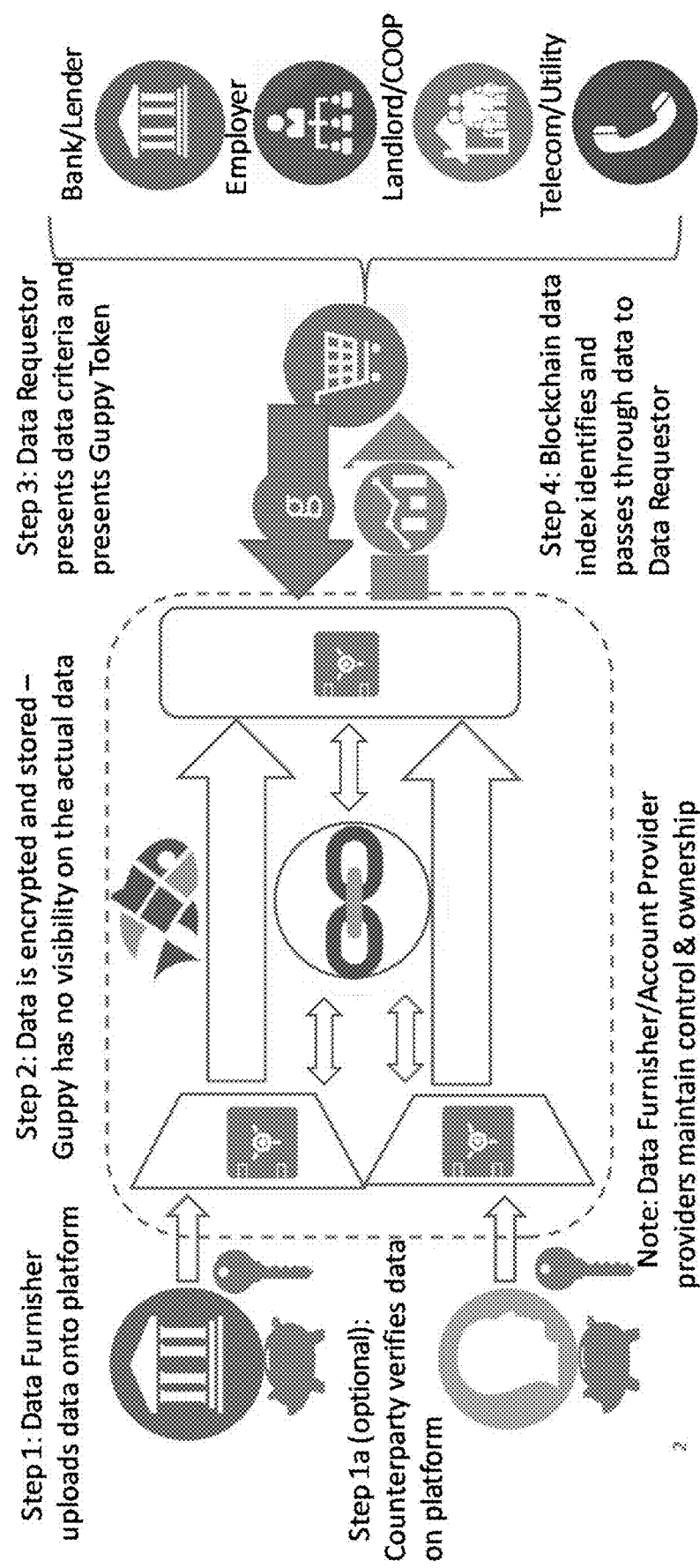
FIG. 1 is a diagram illustrating an example process flow.

Computing systems such as those maintained by credit bureaus and healthcare organizations aggregate large amounts of sensitive data from numerous computing systems. Once the data has been accumulated into a single system, the individuals to whom the data applies have little or no ability to review the data and address any inaccuracies. Likewise, the individuals to whom the data applies have little or no control over the data and who may access it.

Applicant discloses systems and methods for distributed data management and verification. In an example embodiment, a data coordinating system comprises a database adapted to store data about the data that is organized and managed by the system. The data coordinating system comprises an agent for each system that interacts with the coordinating system. The agents may be implemented as smart contracts. The data coordinating system is adapted to receive information identifying data stored on each of a plurality of separate computing systems. The data coordinating system stores data about the data stored on the separate computing systems including the location of the data, the counterparties about whom the data applies, and the entities that have been authorized to access data relating to the various counterparties. The data itself may continue to exist on and be maintained by the independent computing systems. In response to a request for data, the data coordinating system identifies data relevant to the request, determines whether the requesting entity is authorized to access the data, and if so, identifies the location of the data to the requesting entity.

The data coordinating system is adapted to facilitate verification of data that is organized by the system. When a system, which may be referred to as a data furnisher system, requests to add data to the data being organized by the system, the coordinating system resolves the identity of each counterparty to whom the data is relevant. For each identified counterparty, the coordinating system identifies a corresponding counterparty system, and via communications between smart contracts comprised in the coordinating system, communicates the data that has been added to the counterparty system. The counterparty, using his or her system, can review the data, verify that it is correct, dispute the data, or indicate that he/she is not able to respond (due to, for example, not being the appropriate person and/or not having access to the necessary information). The counterparty's response is communicated through the data coordinating system via the relevant smart contracts to the data furnisher system. If the counterparty verified the data, the data coordinating system updates its database to reflect the data has been verified. If the counterparty disputed the data, the data furnisher and counterparty communicate directly or through the system to resolve the dispute. Until the dispute is resolved, the data is marked as such in the data of the data coordinating system. In some instances, a response may not be received from the counterparty system, or the response from the counterparty system may not verify nor dispute the data. In such an instance, the responsive information including an indication the data is neither verified nor disputed is communicated through the data coordinating system the relevant smart contracts to the data furnisher system.

FIG. 1 is a diagram providing an overview of an example processing flow. As shown, at step 1, a data furnisher provides notice that it has data for uploading to the data coordinating system. At step 2, the data is encrypted to prevent unauthorized access, and the data is stored. At step 3, a data requestor presents criteria for data the data requestor wishes to retrieve and possibly purchase. The data requestor may also provide payment for the data. In the example, the payment is made in a currency referred to as Guppy Token, although any suitable currency may be used. At step 4, the data coordinating system identifies the data responsive to the request and passes the data to the data requestor. As noted in FIG. 1, the counterparty maintains control and may earn revenue from providing the data.

Example System

Figure 2:
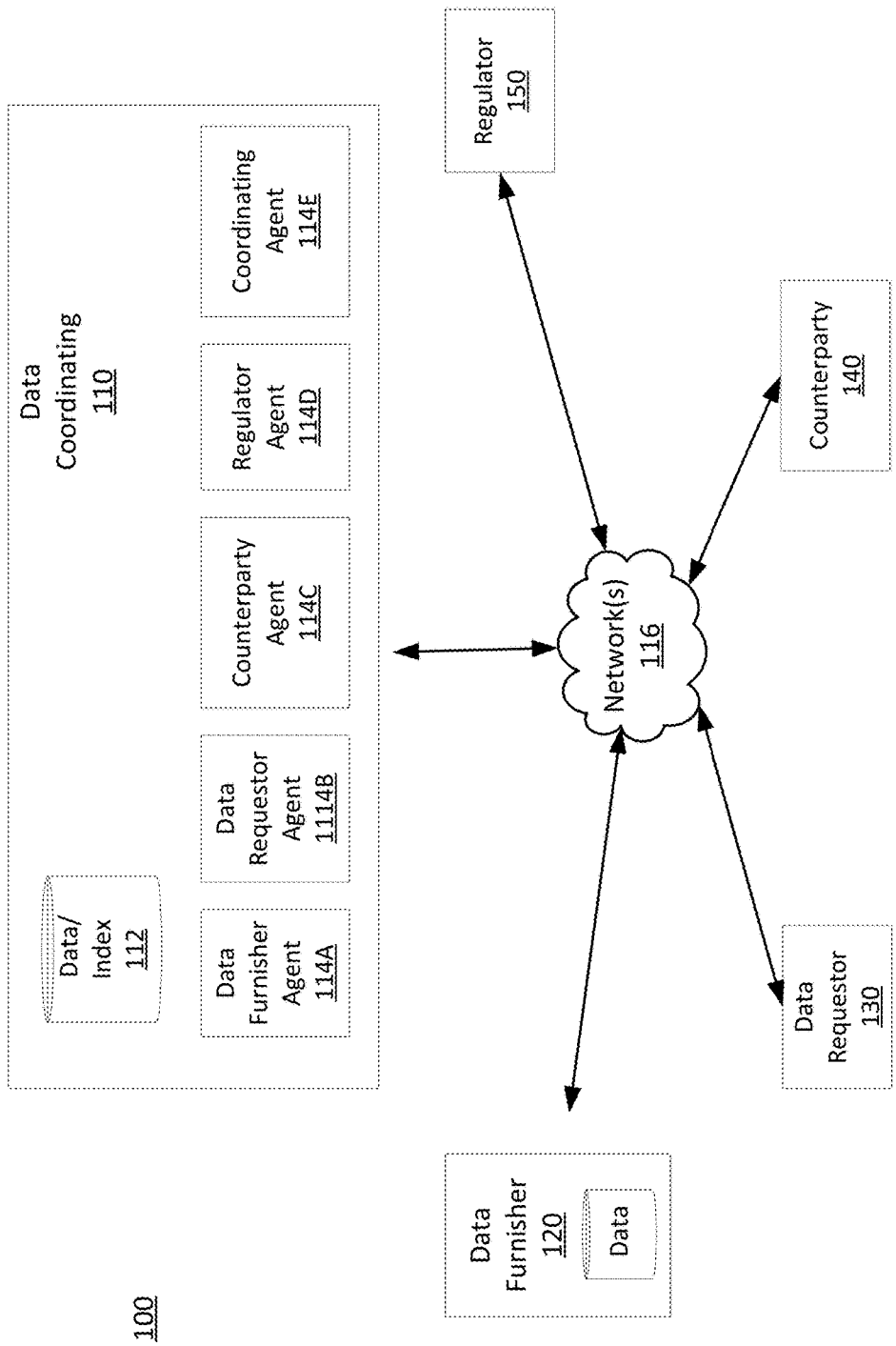
FIG. 2 is a diagram illustrating an example system in which one or more disclosed embodiments may be implemented.
Figure 3:
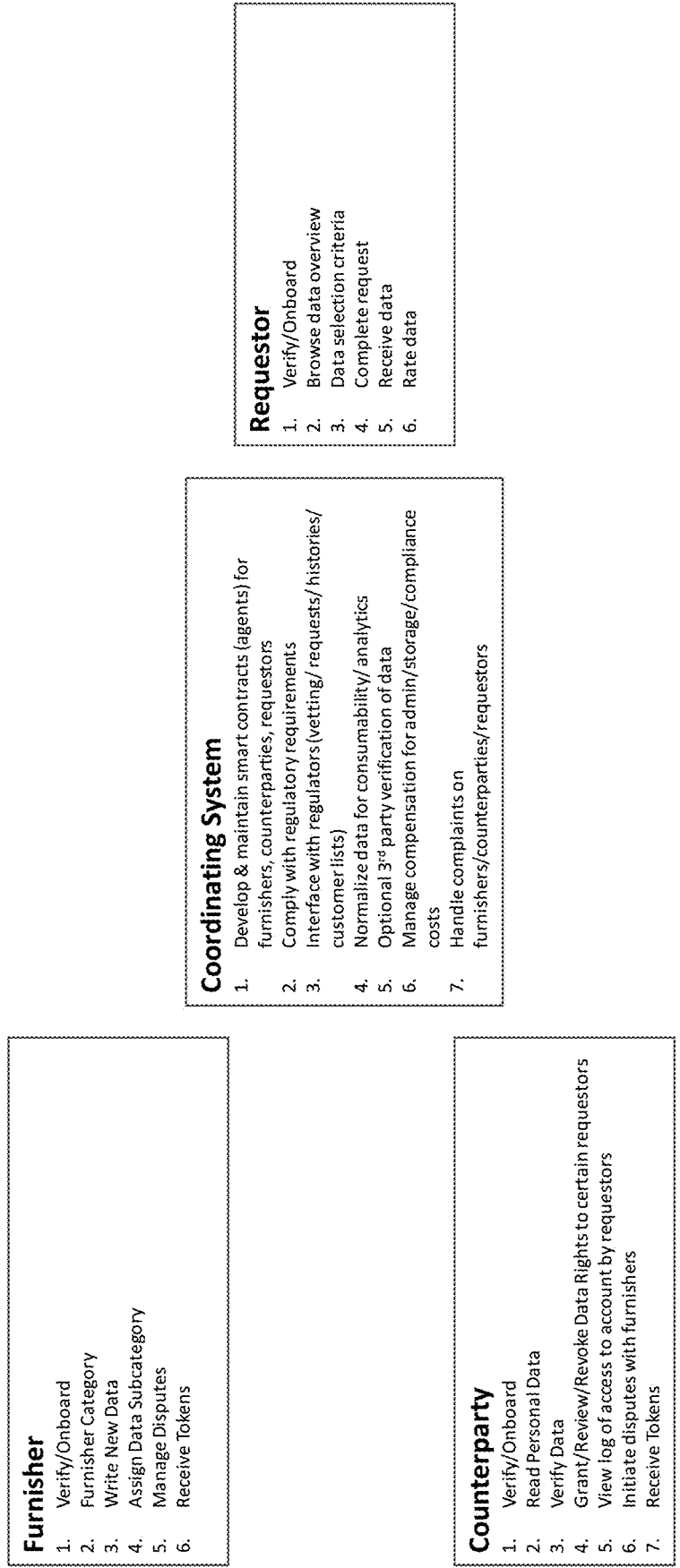
FIG. 3 is a diagram illustrating example functionality provided by example participant systems.

FIG. 2 is a diagram illustrating an example system 100 in which one or more disclosed embodiments may be implemented. As shown, system 100 may comprise data coordinating system 110 which is adapted to coordinate and track data and the participants that interact with the data. FIG. 3 depicts example functionality provided by data coordinating system 110 and other participant systems. As shown in FIG. 2, data coordinating system 110 comprises database management system 112 which is programmed to store data elements, information about the data elements and regarding interactions with the data elements, and information about the individuals and entities that interact with the data. Database management system 112 may store any data suitable for providing the functionality described herein. In an example embodiment, database management system 112 may operate as a central data store and may store therein the actual data that is made available by data issuers. In another example embodiment, data furnishers may use a federated approach which involves the data furnishers maintaining the actual data on their own systems and database management system 112 maintains information about the data including, for example, where it is located on the data furnisher systems (e.g., using a uniform resource locator (URL)), whether the data has been verified, and who has accessed the data. In an example embodiment, a hybrid approach may be taken to data storage wherein the data is stored in a combination of a centralized approach and federated approach with some data furnishers choosing the centralized storage model and others choosing the federated storage model.

In an example embodiment, database management system 112 may be implemented using block chain technology. Database management system 112 may use various cryptographic functions useful for implementing security on the block chain. For example, database management system 112 may employ deterministic wallets to produce single-use addresses for referencing data for purposes of access control. Hashes on data with a nonce may be used to verify that data has not been altered. For example, hashes may be exchanged between smart contracts such as between requestor contracts and counterparty contracts. Hashes may be stored in the block chain, possibly when computed on the counterparty data along with a nonce, to create a linkage between data, with the hash being un-traceable unless someone has the nonce. Database management system 112 may employ public key cryptography to facilitate private and authenticated exchange of information among participants. It will be appreciated that in an embodiment where database management system 112 uses block chain technology, the information on the block chain may be public, but privacy is preserved because the data items are encrypted. It will be appreciated that in terms of block chain, public chains may be available to everyone, while permission block chains are not readable by individuals unless the individual is given permission to join the block chain. In an embodiment of the disclosed systems, the block chain may be permissioned, while in an alternate embodiment, the block chain may be public. The block chain may be used to record actions performed on data, to authenticate data, and to obtain trusted information.

Data coordinating system 110 may further comprise agents 114A-E. Agents 114A-E correspond to the various entities or participants that may interface with system 100 and implement functionality corresponding to the various entities. For example, agents may correspond to data furnishers 114A, data requestors 114B, data counterparties 114C, data regulators 114D, and the data coordinating system itself 114E. In an example embodiment, wherein database management system 112 is implemented using block chain technology, agents 114A-E may be implemented as smart contracts. For example, agent 114A may be a smart contract that corresponds to a data furnisher system that provides or registers data with the system. Agent 114B may be a smart contract that corresponds to a particular requestor of data managed by the system. Agent 114C may be a smart contract that corresponds to a counterparty who interfaces with the system 110 to verify data and grant access to data. Agent 114D may be a smart contract that corresponds to an entity that operates to review and regulate the use of data organized by data coordinating system 110. Agent 114E may be a smart contract that corresponds to the data coordinating system itself and operates to interact on behalf of coordinating system 110 with the various participants. Interactions amongst smart contracts 114A-E may take place directly (peer-to-peer) or may be mediated between data coordinating contract 114E. The particular method of communication between smart contracts may reflect the business relationships that exist between the entities to which the smart contracts correspond. For example, smart contracts 114A-D may interact with data coordinating contract 114E as if data coordinating contract 114E serves the role of a centralized bureau managing use and access to data.

System 100 may further comprise data furnisher systems 120. Data furnisher systems 120 are adapted to interface with data coordinating system 110 and provide functionality used by an entity that furnishes data for management by data coordinating system 110. FIG. 3 notes functionality that may be provided by an example data furnisher system 120. In an example embodiment, data furnisher system 120 may be programmed, for example, to: perform functionality relating to verifying and onboarding the system; furnish categories for data; write new data for the system; assign categories to data; manage disputes over data; and address monetary transactions. It will be appreciated that each entity that provides data for management by data coordinating system 110 may have a corresponding data furnisher system 120. Further, each data furnisher system 120 may have a corresponding agent or smart contract 114A executing in data coordinating system 110 to facilitate operations with the coordinating system 110.

System 100 may also comprise data requestor systems 130. Data requestor systems 130 are adapted to interface with data coordinating system 110 and provide functionality to retrieve data that is managed by data coordinating system 110. FIG. 3 notes functionality that may be provided by an example data requestor system 130. In an example embodiment, data requestor system 130 may be programmed, for example, to: perform functionality relating to verifying and onboarding of the system relative to system 110; browse data coordinated by the data coordinating system 110; enter data selection criteria; complete selection of data and corresponding transactions; receive data; and rate the data. It will be appreciated that each entity that retrieves data managed by data coordinating system 110 may have a corresponding data requestor system 130. Further, each data requestor system 130 may have a corresponding agent or smart contract 114B executing in data coordinating system 110 to facilitate operations with the data coordinating system 110.

Counterparty systems 140 are adapted to interface with data coordinating system 110 and provide functionality used by counterparties to interface with data coordinating system 110. FIG. 3 notes functionality that may be provided by an example counterparty system 140. In an example embodiment, counterparty system 140 may be programmed, for example, to: perform functionality relating to verifying and onboarding the system relative to system 110; furnish categories for data; write new data for the system; assign categories to data; initiate uploading of data from a remote location or third party system; review data alleged to be relevant to the particular counterparty and which a data furnisher proposes adding to the system; verify data; grant/review/revoke access to data to particular requestors; view logs of accesses to data by requestors; initiate disputes with data furnishers; and address financial aspects of interacting with data coordinating system 110. It will be appreciated that each entity or person that operates as a counterparty relative to the data managed by data coordinating system 110 may have a corresponding counterparty system 140C. Further, each counterparty system 140 may have a corresponding agent or smart contract 114C executing in data coordinating system 110 to facilitate operations with the data coordinating system 110.

Regulator systems 150 are adapted to interface with data coordinating system 110 and provide functionality used by persons and entities that regulate use of data that is organized by data coordinating system 110. It will be appreciated that each entity or person that operates as a regulator relative to the data managed by data coordinating system 110 may have a corresponding regulator system 150. Further, each regulator system 150 may have a corresponding agent or smart contract 114D executing in data coordinating system 110 to facilitate operations with the data coordinating system 110.

Networks 116 are adapted to communicate data between data issuer systems 120, data provider systems 130, data counterparty systems 140, regulator systems 150, and data coordinating system 110. Networks 116 may comprise one or more networks that are suitable to communicate data including, for example, wireless networks, wireline networks, local area networks, wide area networks, and the Internet.

It will be appreciated that data furnisher systems 120, data requestor systems 130, counterparty systems 140, and regulator systems 150 may interact with data coordinating system 110 and may communicate through data coordinating system 110 with each other. Systems 120, 130, 140, and 150 may also communicate with each other in private exchanges outside of the data coordinating system 110. Such exchanges may take place off chain, or without being captured by data coordinating system 110. It will be appreciated that participants may utilize multiple independent instances of the "data coordination system" that are isolated from each other (possibly isolated by data type/purpose). Web based applications which are accessed and executed by systems 120, 130, 140, and 150 may be employed to exchange information privately using the public keys corresponding to entities as obtained from database management system 112 which may be implemented as a block chain.

Figure 4:
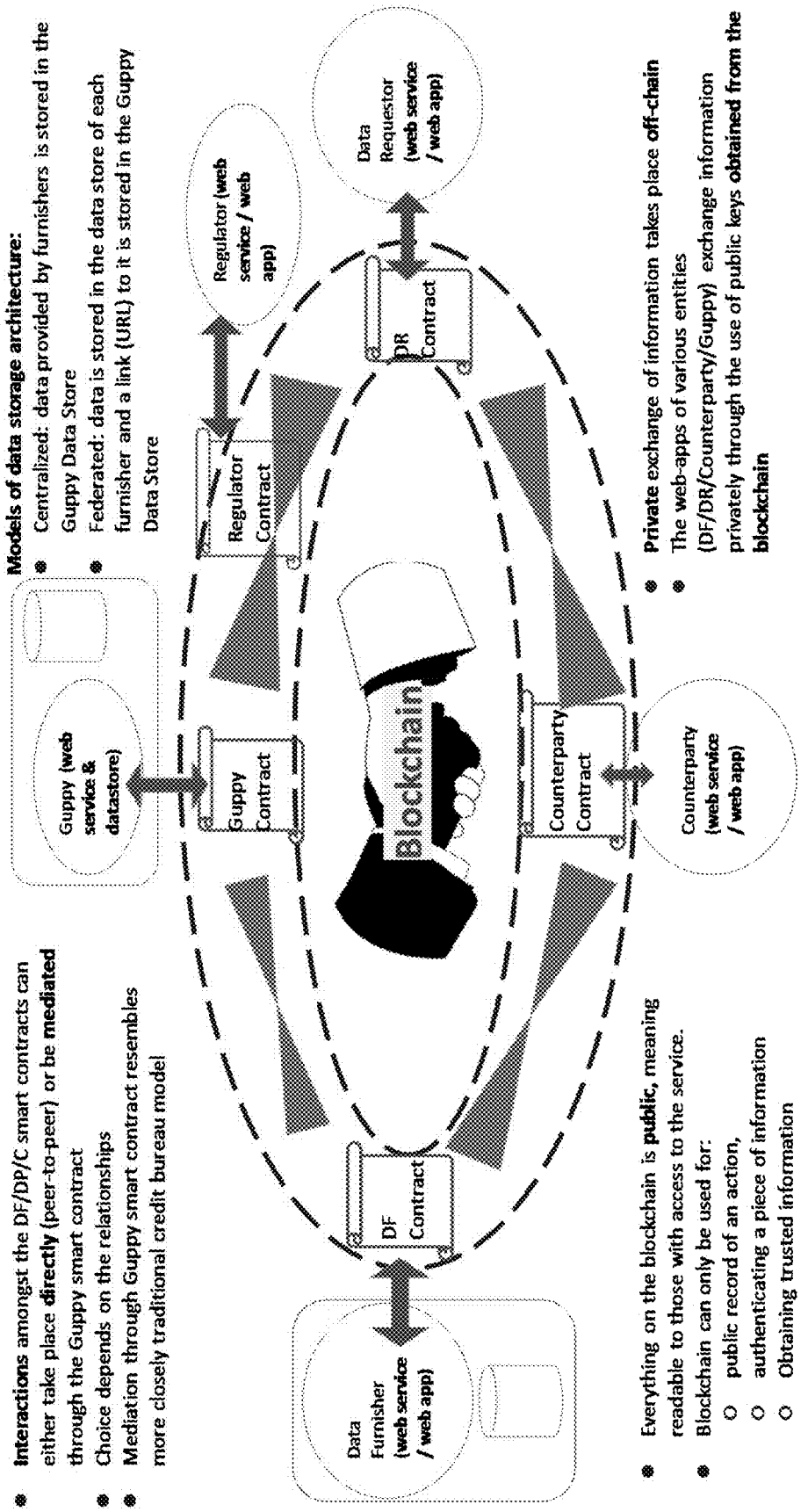
FIG. 4 is a diagram illustrating an example system for data management and verification.

FIG. 4 provides an alternative depiction of an example system for providing data management and verification. The alternative depiction illustrates similar system participants and components as depicted in FIG. 2 but using different graphics and with relevant notes.

Participant System Registration

Each participant that interfaces with data coordinating system 110 may be required to register with the system. Accordingly, each data furnisher system 120 may communicate a system registration request to data coordinating system 110. In response to the request, data coordinating system 110 may generate a private/public key pair to be associated with the data furnisher system 120. Data coordinating system 110 creates an agent or smart contract 114A that serves to represent the data furnisher system 120 in system 110. The smart contract 114A associated with data furnisher system 120 is owned by or associated with the network address of the data furnisher system 120. In an example embodiment, smart contract 114A may comprise the public key that was generated for the data furnisher system 120. The smart contract 114A interacts with other smart contracts and may be supervised by smart contract 114E associated with data coordinating system 110. Smart contract 114A may interact with the corresponding data furnisher system 120 and other systems using the public key. For example, smart contract 114A may encrypt information intended to be consumed only by data furnisher system 120 using the public key generated for the data furnisher system 120. Other systems that interact with data coordinating system 110 may likewise employ the public key to communicate with and regarding the data furnisher system 120. Smart contract 114E corresponding to data coordinating system 110 may process the request from the data furnisher system 120. Smart contract 114E may generate and store data on database 112 corresponding to the newly registered data furnisher system 120. The stored data may comprise the public key corresponding to the public/private key pair.

Figure 5:
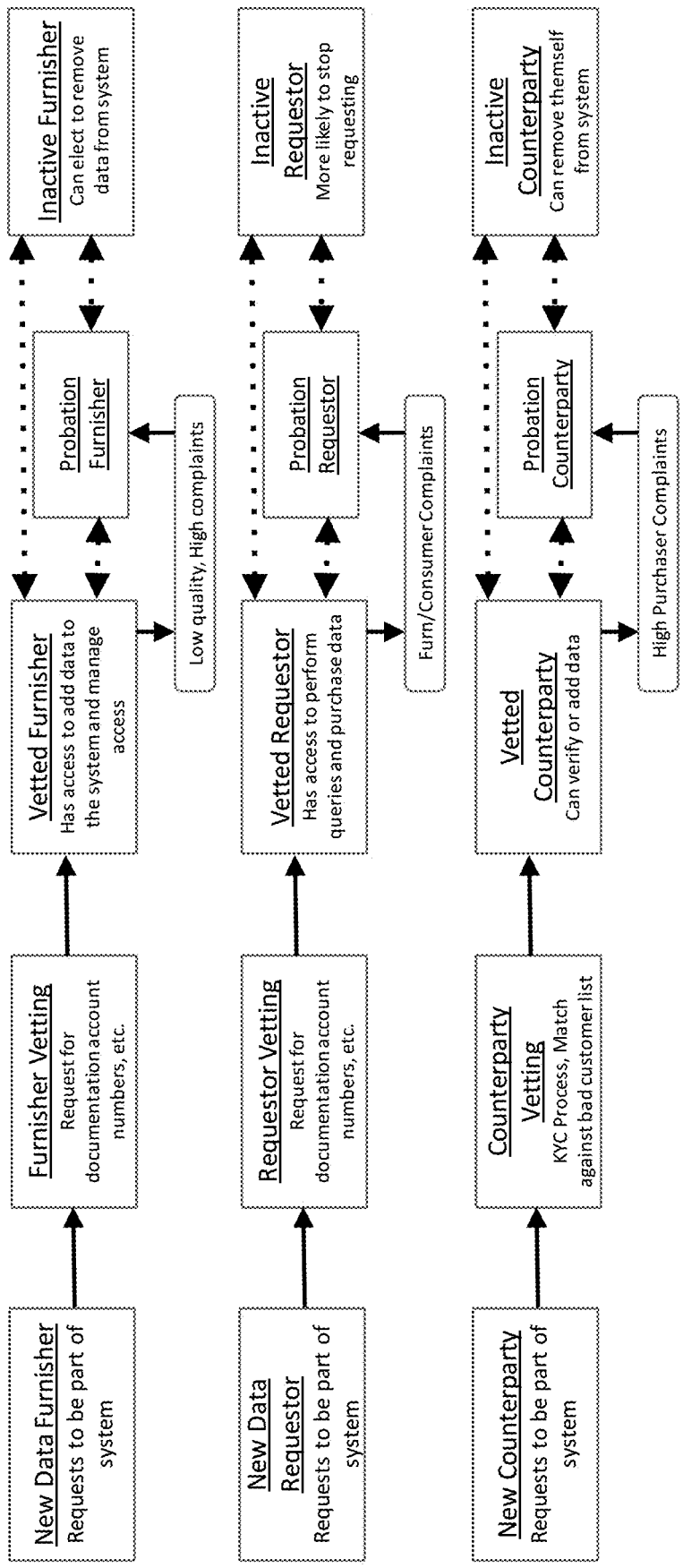
FIG. 5 is a diagram illustrating example states that may be associated with participant systems during example processing.

Data coordinating system 110 may manage states for systems that register with it. For example, and as illustrated in FIG. 5, in response to the initial registration of data furnisher system 120, data coordinating system 110, and in an example embodiment data coordinating smart contract 114E, may store an indication that the data furnisher system 120 is in an "inVetting" state. The "inVetting" state may be associated with contract 114A associated with the data furnisher system 120. Subsequently, data coordinating smart contract 114E may interface with the coordinating system 110 to change the state from "inVetting" to "Vetted" in response to input from a supervising entity. The state may be changed depending upon circumstances. For example, data coordinating smart contract 114E may change the state of the data furnisher system 120 to "InProbation" or "InActive" depending upon information provided by or relevant to the data furnisher system 120. Data coordinating smart contract 114E and data furnisher smart contract 114A may change the state to reactivate the system and its corresponding smart contract. It will be appreciated that as the state of the system changes, the ability of the system to interface with data coordinating system 110 also changes.

Similar registration processing may be performed for each data requestor system 130 that interfaces with data coordinating system 110. Each data requestor system 130 may communicate a system registration request to data coordinating system 110. In response to the request, data coordinating system 110 may generate a private/public key pair to be associated with the data requestor system 130. Data coordinating system 110 creates an agent or smart contract 114A that serves to represent the data requestor system 130. The smart contract 114B associated with data requestor system 130 is owned or associated with the network address of the data requestor system 130. In an example embodiment, smart contract 114B may comprise the public key that was generated for the data requestor system 130. The smart contract 114B interacts with other smart contracts and may be supervised by smart contract 114E associated with the data coordinating system 110. Smart contract 114E may interact with the corresponding data requestor system 130 and other systems using the public key. For example, smart contract 114B may encrypt information intended to be consumed only by data requestor system 130 using the public key generated for the data requestor system 130. Other systems that interact with data coordinating system 110 may likewise employ the public key to communicate with and regarding the data requestor system 130. Smart contract 114E corresponding to data coordinating system 110 may process the request from the data requestor system 130. Smart contract 114B may generate and store data on database 112 corresponding to the newly registered data requestor system 130. The stored data may comprise the public key corresponding to the public/private key pair.

Data coordinating system 110 may manage states for data requestor system 130. In response to the initial registration of data requestor system 130, and as illustrated in FIG. 5, data coordinating smart contract 114E may store an indication that data requestor system 130 is in an "inVetting" state. The "inVetting" state may be associated with smart contract 114B associated with the data requestor system 130. Subsequently, data coordinating smart contract 114E may interface with the coordinating system 110 to change the state from "inVetting" to "Vetted" in response to input from a supervising entity. The state may be changed depending upon circumstances. For example, data coordinating smart contract 114E may change the state of the data requestor system 130 to "InProbation" or "InActive." Data coordinating smart contract 114E and data requestor system smart contract 114B may change the state to reactivate the system and its corresponding smart contract. It will be appreciated that as the state of the system changes, the ability of the system to interface with data coordinating system 110 also changes.

Similar registration processing may be performed for each counterparty system 140 that interfaces with data coordinating system 110. A counterparty system 140 may communicate a system registration request to data coordinating system 110. In response to the request, data coordinating system 110 may generate a private/public key pair to be associated with the data counterparty system 140. Data coordinating system 110 creates an agent or smart contract 114A that serves to represent the counterparty system 140. The smart contract 114C associated with counterparty system 140 is owned or associated with the network address of the counterparty system 140. In an example embodiment, smart contract 114C may comprise the public key that was generated for the counterparty system 140. The smart contract 114C interacts with other smart contracts and may be supervised by the smart contract associated with the data coordinating system 110. Smart contract 114C may interact with the corresponding counterparty system 140 and other systems using the public key. For example, smart contract 114C may encrypt information intended to be consumed only by counterparty system 140 using the public key generated for the counterparty system 140. Other systems that interact with data coordinating system 110 may likewise employ the public key to communicate with and regarding the counterparty system 140. Smart contract 114E corresponding may process the request from the counterparty system 140. Smart contract 114E may generate and store data on database 112 corresponding to the newly registered counterparty system 140. The stored data may comprise the public key corresponding to the public/private key pair.

Data coordinating system 110 may manage states for registered counterparty systems 140. For example, in response to the initial registration of counterparty system 140, and as illustrated in FIG. 5, data coordinating system 110, and in an example embodiment, data coordinating smart contract 114E, may store an indication that counterparty system 140 is in an "inVetting" state. The "inVetting" state may be associated with smart contract 114C corresponding to the counterparty system 140. Subsequently, data coordinating smart contract 114E may interface with the coordinating system 110 to change the state from "inVetting" to "Vetted" in response to input from a supervising entity. The state may be changed depending upon circumstances. For example, data coordinating smart contract 114E may change the state of the counterparty system 140 to "InProbation" or "InActive." Data coordinating smart contract 114E and counterparty system smart contract 114C may change the state to reactivate the system and its corresponding smart contract. It will be appreciated that as the state of the system changes, the ability of the system to interface with data coordinating system 110 also changes.

Data Registration and Verification

Figure 6:
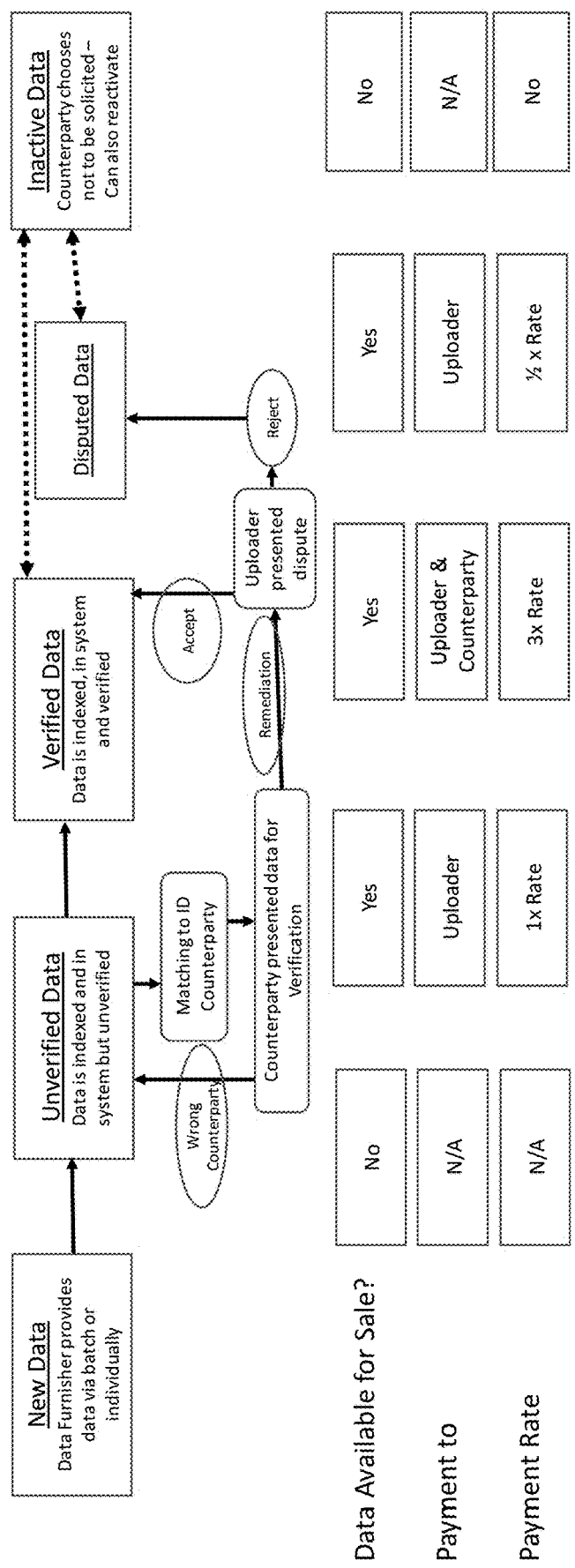
FIG. 6 is a diagram illustrating example states that may be associated with data in an example data coordinating system.
Figure 10:
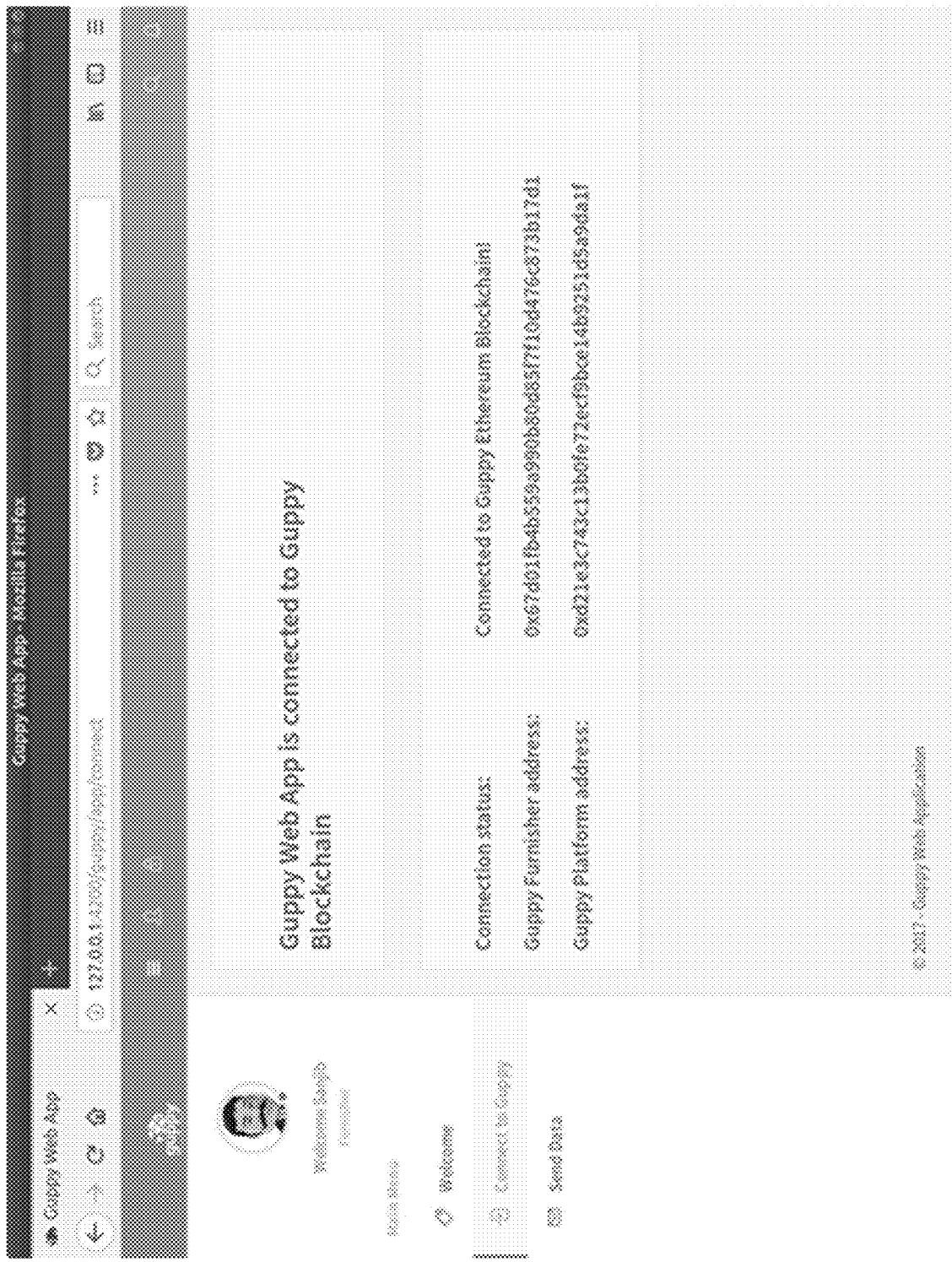
FIG. 10 depicts an example user interface.
Figure 11:
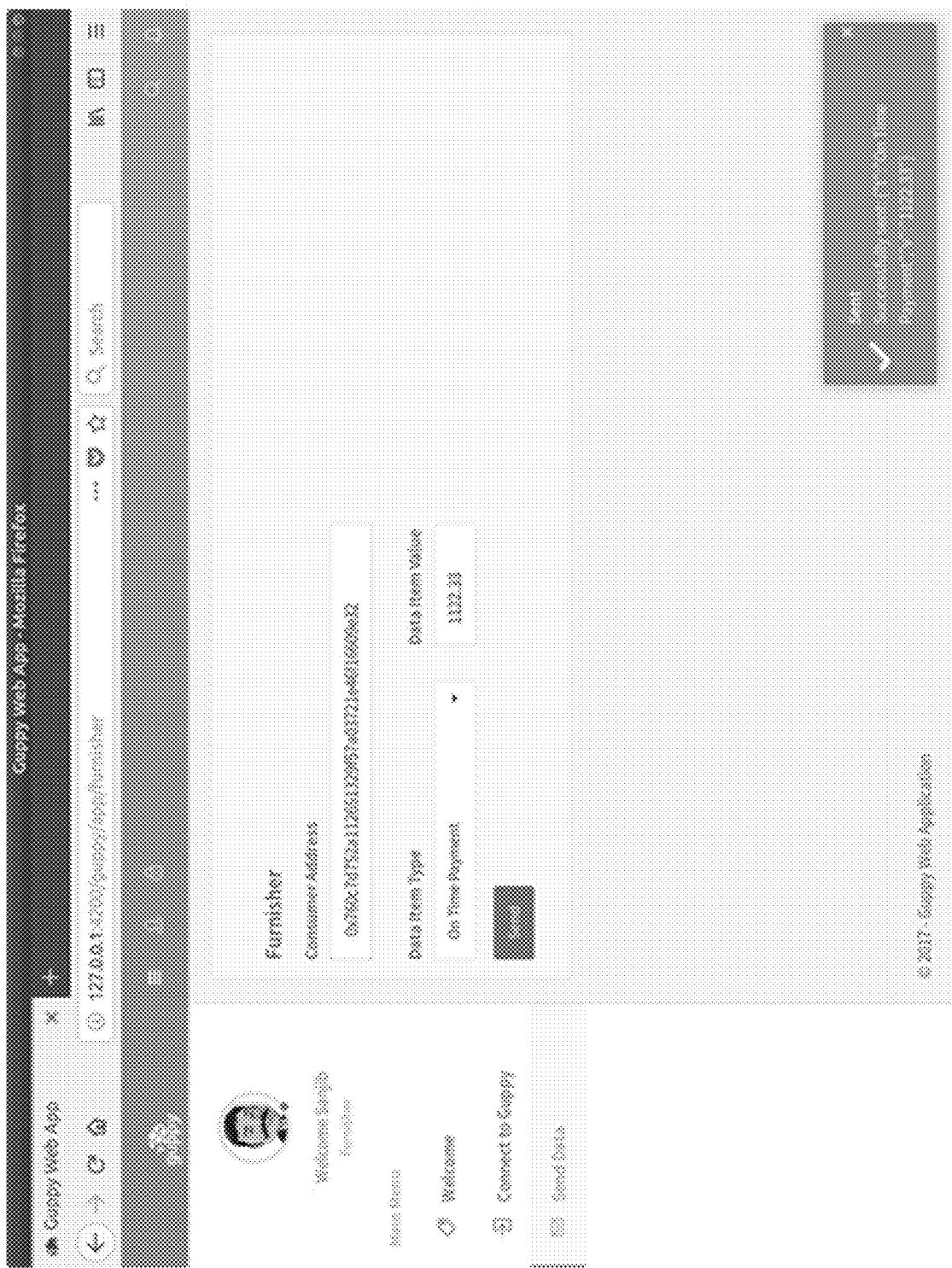
FIG. 11 depicts an example user interface.

After a data furnisher system 120 registers with data coordinating system 110, it may make data available to others via data coordinating system 110. In an example embodiment, when a registered data furnisher connects to the system, they may be presented with an interface such as shown in in FIG. 10. The interface may be generated using Web technology and may provide information identifying the data furnisher. In an example embodiment, the interface may identify the contracts that the data furnisher will likely interact with, which in the example illustration, may be the data furnisher's own contract and the data coordinating contract. The data furnisher may specify the data that he/she wishes to provide to the system. As shown in FIG. 11, this may involve entering information about the counterparty about whom the data is relevant. In an example embodiment, data furnisher system 120, possibly using a web application executing thereon, may generate a hash of the new data to be brought under management by data coordinating system 110. Data furnisher system 120 may use the public key corresponding to smart contract 114E to encrypt the identity of the counterparty for whom new data is provided. Data furnisher system 120 communicates with smart contract 114A to add the hash of the new data to smart contract 114A. The data itself may also be communicated to smart contract 114A. The entry of the hash operates as a public record that the corresponding data has been entered into the system. Data coordinating system 110 may maintain states for the data that is coordinated by the system. Initially, the state, which may be stored in database 112 along with the hash for the data, may be set to "unverified." Where the data itself was communicated, smart contract 114A may store the data in database 112. FIG. 6 illustrates the movement of data through various states during the data registration or intake process. As shown, new data that is proposed to be added by a data furnisher system 120 initially has a status of unverified data.

Data furnisher system 120 submits the encrypted counterparty identity data to smart contract 114E corresponding to data coordinating system 110 and requests that the identity of the customer be resolved. Smart contract 114E determines the smart contract 114C that corresponds to the counterparty for whom data is being provided and for which verification is needed and communicates the identity to smart contract 114A corresponding to data furnisher system 120. Data furnisher smart contract 114A responds to the identification of the counterparty by communicating notification to data furnisher system 120. Data furnisher system 120 uses the address of smart contract 114C to request the public key for the corresponding counterparty from smart contract 114E. Upon receipt of the public key for the counterparty system 140, data furnisher system 120 uses the public key to encrypt the data for the counterparty. Data furnisher system 120 creates a hash of the encrypted data and uploads the encrypted counterparty data to data coordinating system 110 where the encrypted data may be stored in database 112 along with the hash of the data. Data furnisher system 120 sends a message to counterparty smart contract 114C that data is available for review. The message may comprise the hash of the data, which the counterparty may use to access the data. It will be appreciated that as an alternate embodiment, the coordinating system 110 may perform the data encryption and/or data notification. In other words, the coordinating system 110 may mediate exchanges between the peer smart contracts. Once the data is sent to the counterparty system 140, the data furnisher 120 may receive notification that the data has been sent as illustrated in FIG. 11.

Figure 12:
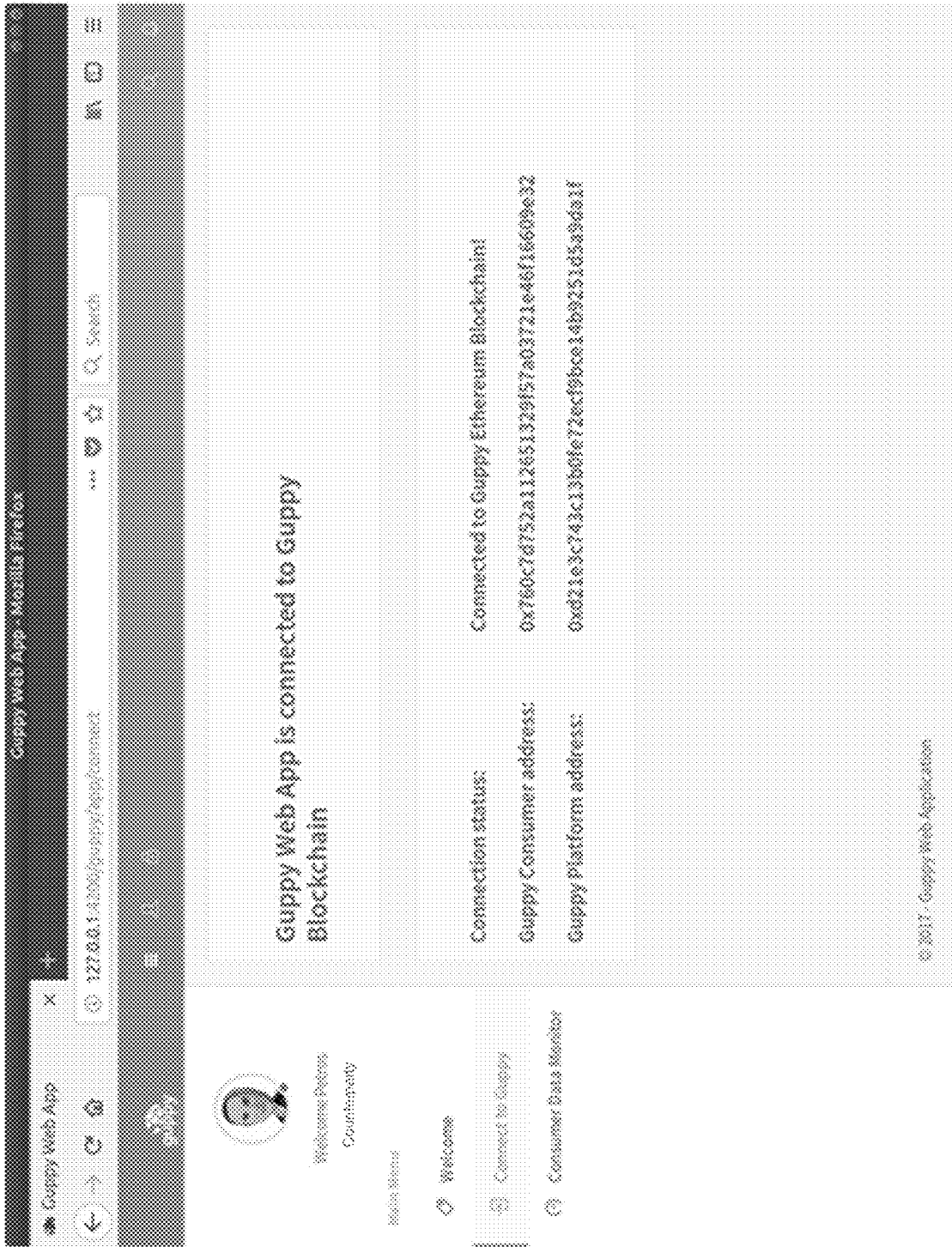
FIG. 12 depicts an example user interface.
Figure 13:
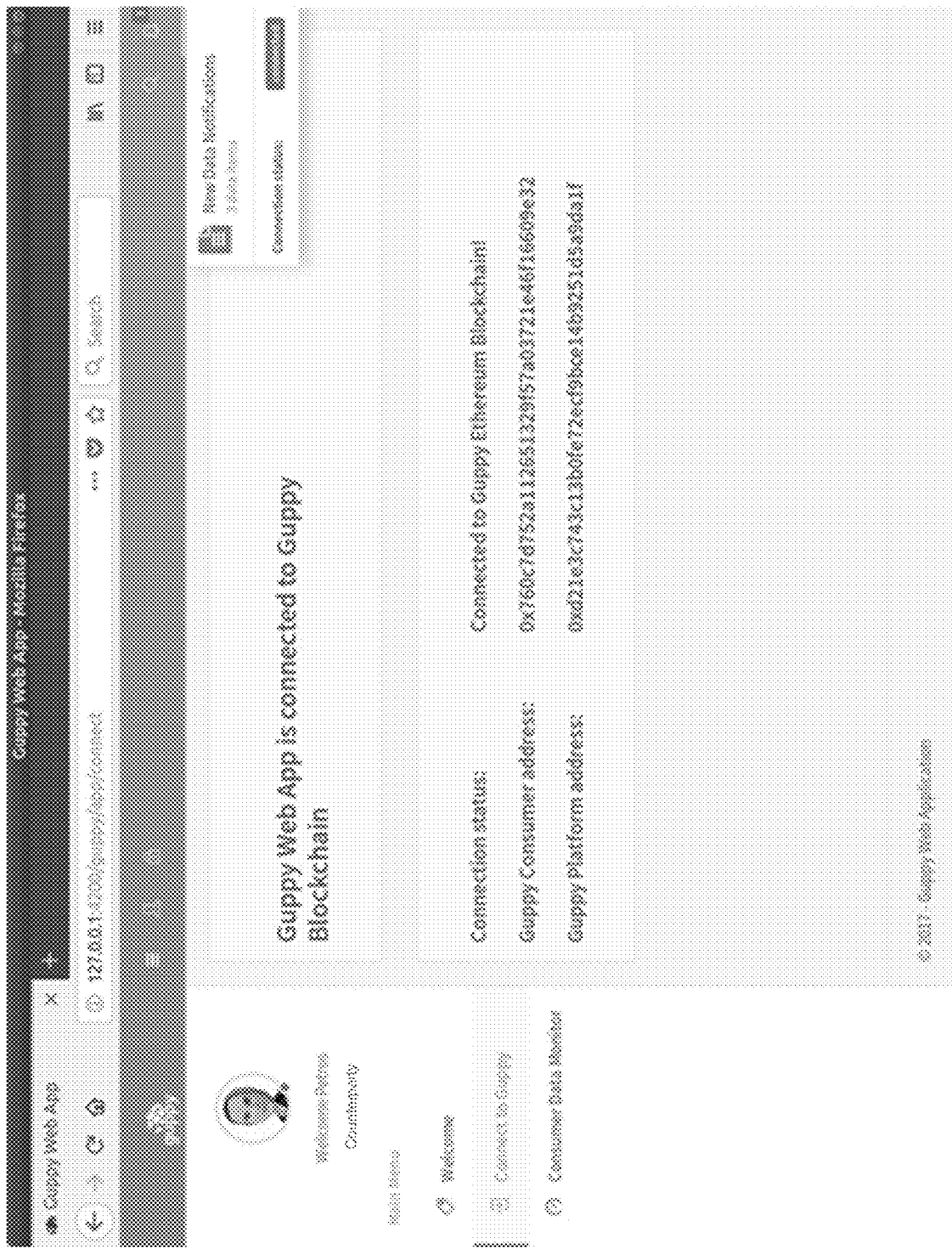
FIG. 13 depicts an example user interface.
Figure 14:
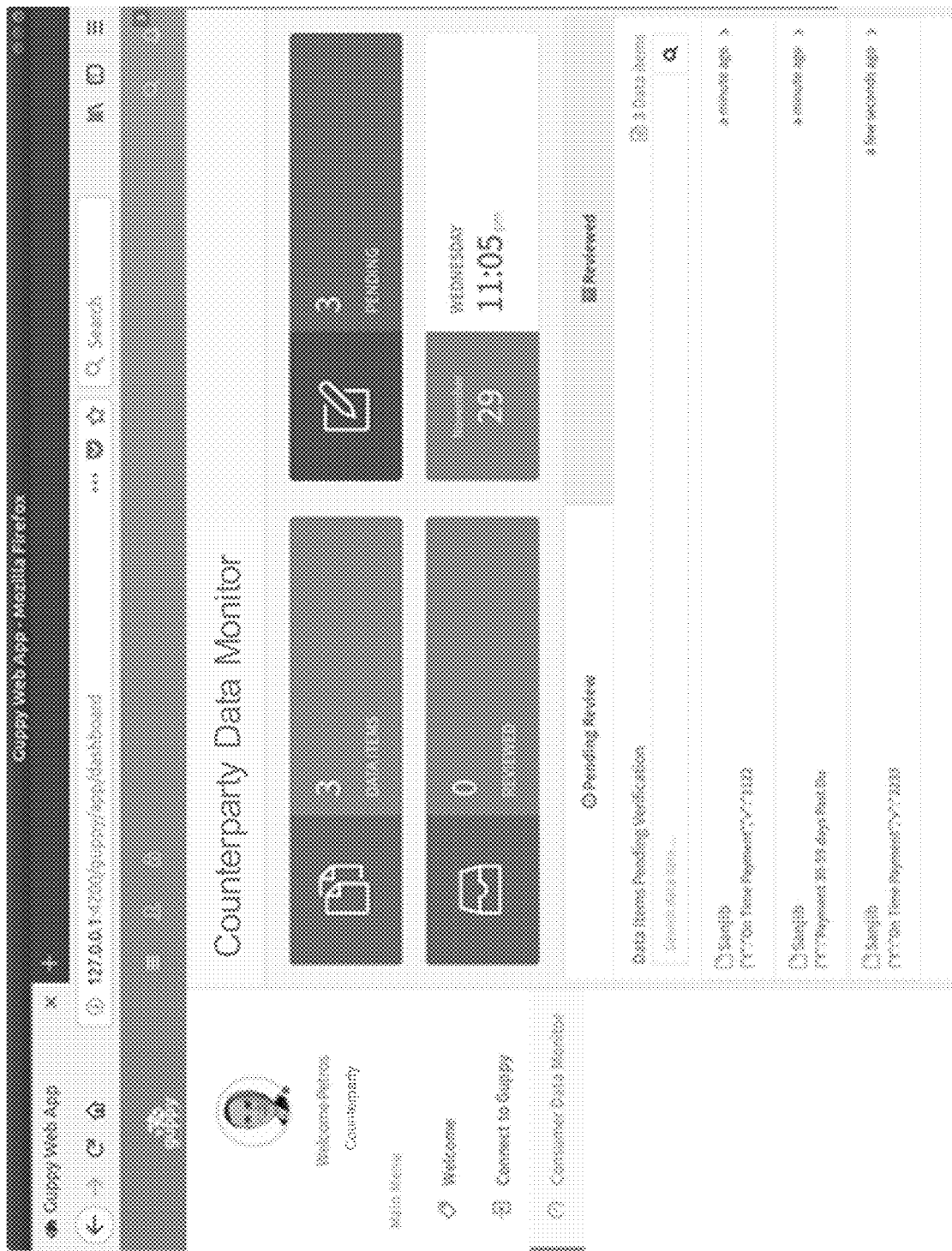
FIG. 14 depicts an example user interface.

In an example scenario, a counterparty may be logged into counterparty system 140 and have an example interface displayed such as shown in FIG. 12. The counterparty system 140 may receive an indication that data alleged to correspond to the counterparty has been made available via the system. FIG. 13 illustrates an example interface with a notification thereon. The counterparty system 140 may receive the indication or notice from its corresponding counterparty smart contract 114C, which itself received notice from a data issuer smart contract 114A. In another embodiment, an indication that data is waiting for review may be received directly from the data furnisher system 120 that has proposed adding the data. The counterparty system 140 may generate an example interface such as depicted in FIG. 14 which shows the status of items that the counterparty has reviewed and items that the counterparty needs to review. Counterparty system 140 may receive the interface from coordinating system 110. Using the interface, the counterparty may see details of the data items.

Figure 15:
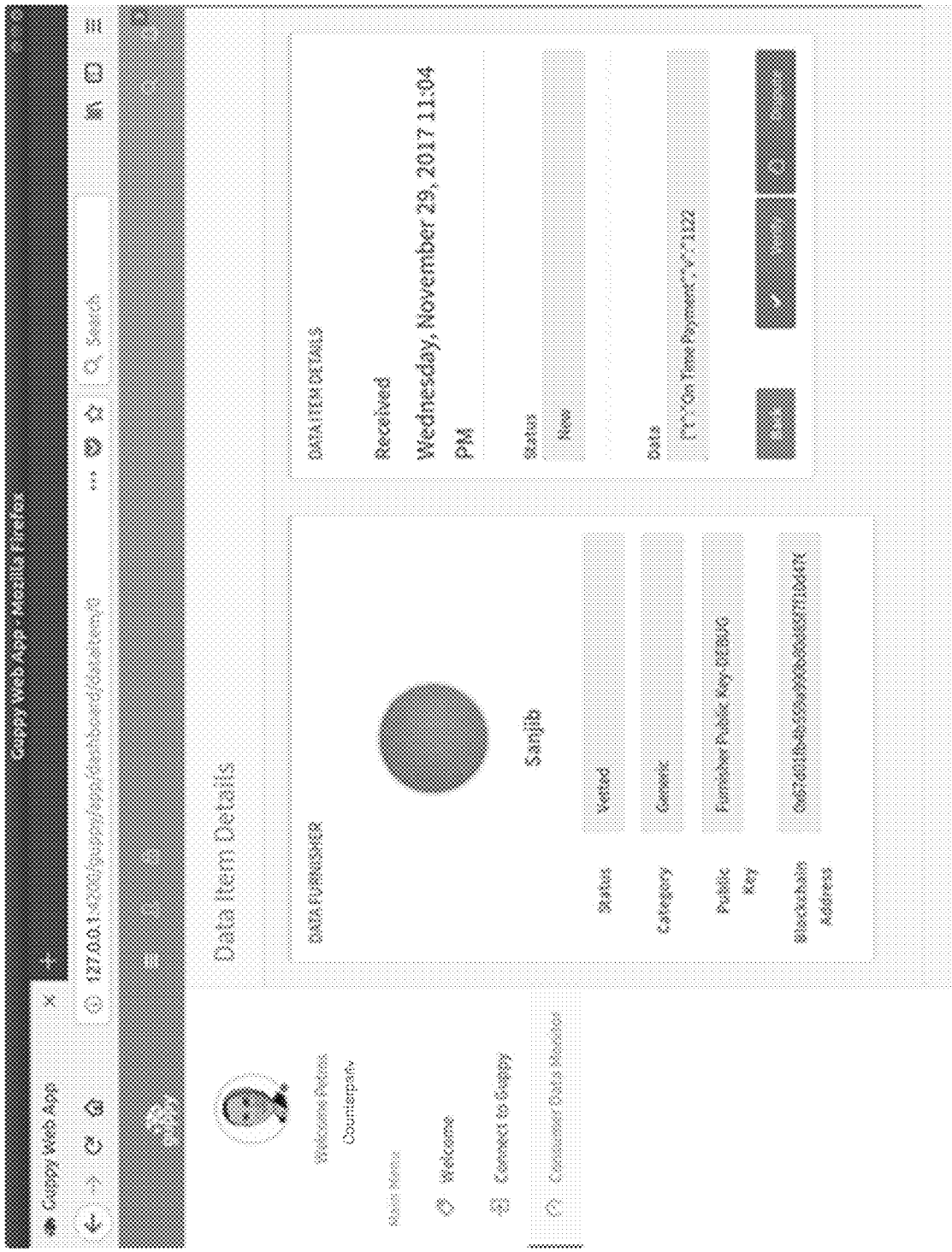
FIG. 15 depicts an example user interface.
Figure 16:
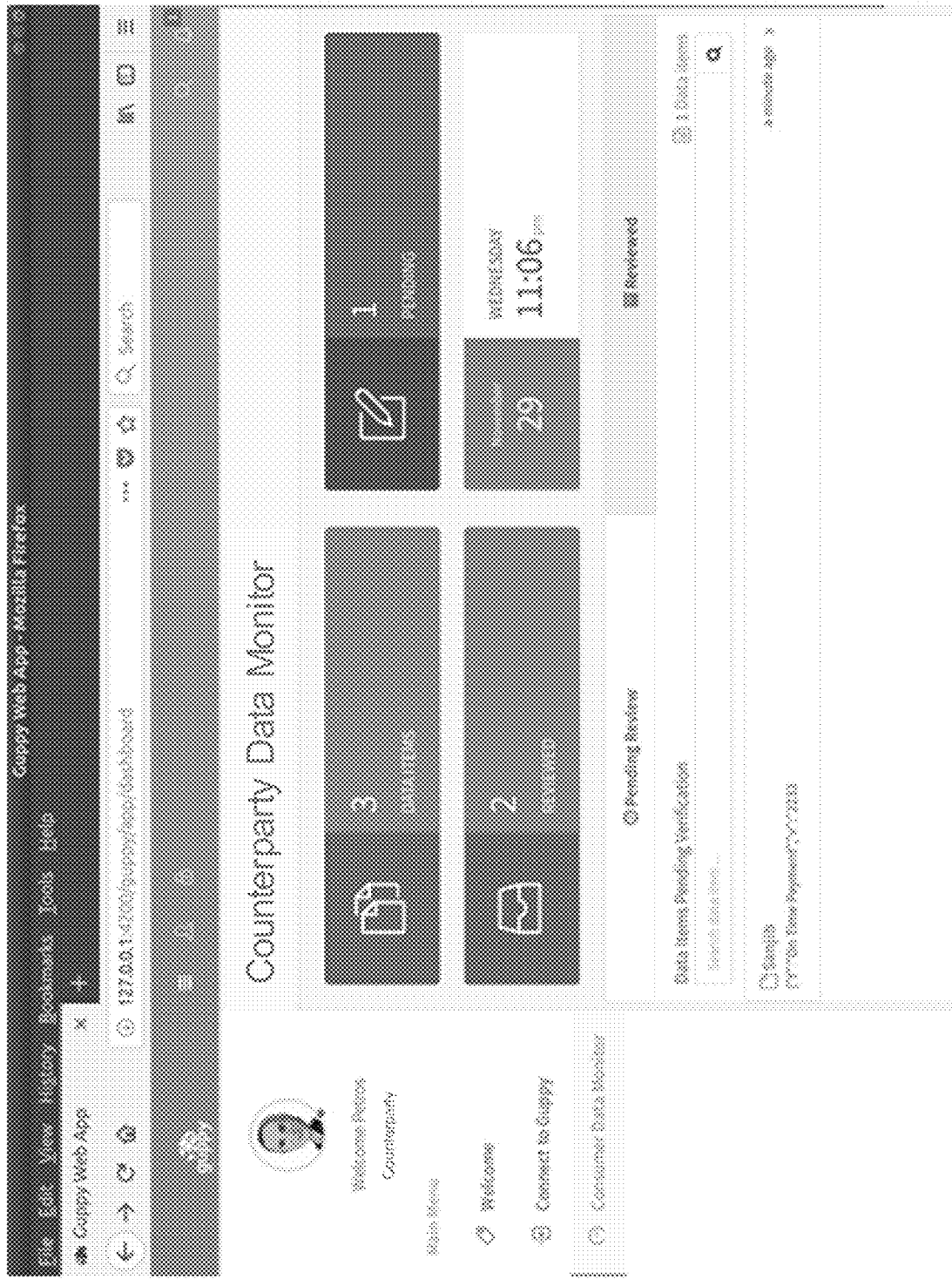
FIG. 16 depicts an example user interface.
Figure 17:
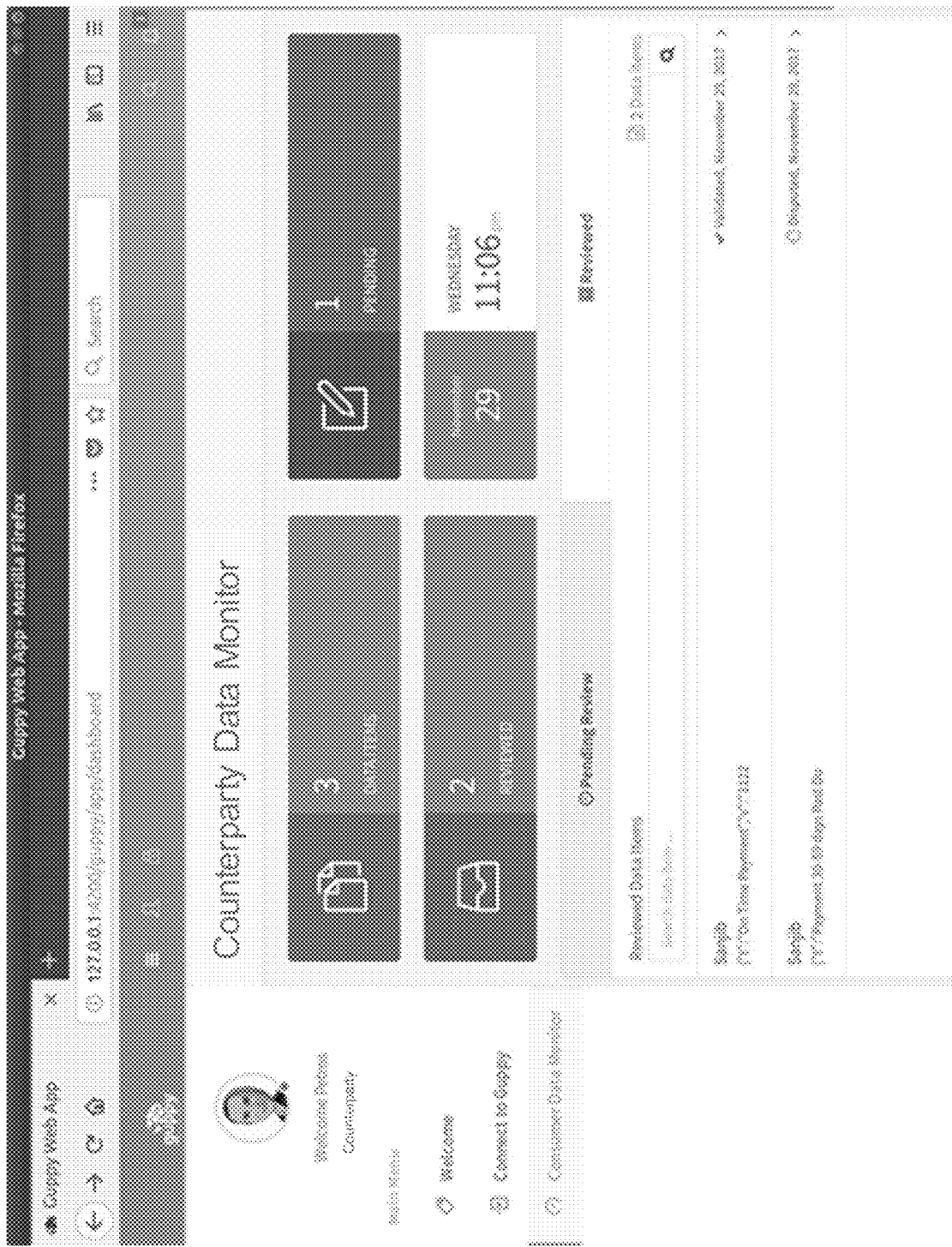
FIG. 17 depicts an example user interface.

In response to the notification that data is waiting for review, counterparty system 140 retrieves the data. In an example embodiment, counterparty system 140 may have received as part of the notification, the actual data that requires review. In another embodiment, counterparty system 140 may have received an index or pointer which counterparty system 140 may communicate to its corresponding smart contract 114C. Smart contract 114C uses the index to retrieve the data that requires review from database 112. The data may be returned to smart contract 114C and forwarded to counterparty system 140. The data that requires review may have been encrypted using the public key corresponding to the counterparty system 140. Counterparty system 140 uses the private key to decrypt the data and may present the data for review. The counterparty reviews the data and enters an indication of whether the data is verified as legitimate or disputed. In some instances, the counterparty may indicate that the data is neither verified nor disputed. For example, the counterparty may not have time or records available to judge the veracity of the data. In other instances, the counterparty may not be the appropriate entity to verify the data. FIG. 15 depicts an example interface that may be generated at counterparty system 140 for presenting data to a counterparty for review. The details of the data are made available to the counterparty as a consequence of the system's access to the private key. Details presented to the counterparty may comprise an indication of who provided it, a time stamp, and other metadata. The counterparty may be presented with interfaces that allow for tracking the status of data items that are pending review and those have been reviewed as illustrated in FIGS. 16 and 17.

Counterparty system 140 generates and transmits a message to the corresponding counterparty smart contract 114C indicating whether the reviewed data is verified, disputed, or neither verified nor disputed. Counterparty smart contract 114C sends a message to the data furnisher smart contract 114A to change the status of the data to verified, disputed, or neither verified nor disputed. Data furnisher smart contract 114A communicates a request to data coordinating smart contract 114E to change the status, which data coordinating smart contract 114E implements by updating database 112 with the updated status. As illustrated in FIG. 6, the status or state may be set to either "verified" or "disputed." It will be appreciated that in other instances, the status may be set to neither verified nor disputed. Data furnisher smart contract 114A notifies data furnisher system 120 in an instance the data is disputed, in which case, data furnisher system 120 may initiate a dispute resolution process.

It will be appreciated that the disclosed processing for data verification provides for forming a distributed consensus that enables verification and validation of the data through transactions and independent of the trustworthiness of a central system.

In an example embodiment, whether data items are made available for review and possibly purchase to other participants may be dictated by the state in which the data item is specified. As shown, in FIG. 6, in an example embodiment a data item that is entered for management by data coordinating system 110 may be available for review and/or sale when in any of the unverified, verified, or disputed states. The participants that receive remuneration for viewing data may change depending upon the state of the data. For example, when a data item is verified, both the furnisher of the data and the counterparty who verified the data may receive payment. Further, the amount that may be paid for access a data item may change depending upon the state. For example, verified data may result in a relatively high payment, while disputed data may result in a relatively low payment to the data furnisher. It will be appreciated that assigning different payment amounts based upon the verification status of the data generates an incentive to provide and maintain verifiable data. Accordingly, data providers are incentivized to provide good data.

Figure 7:
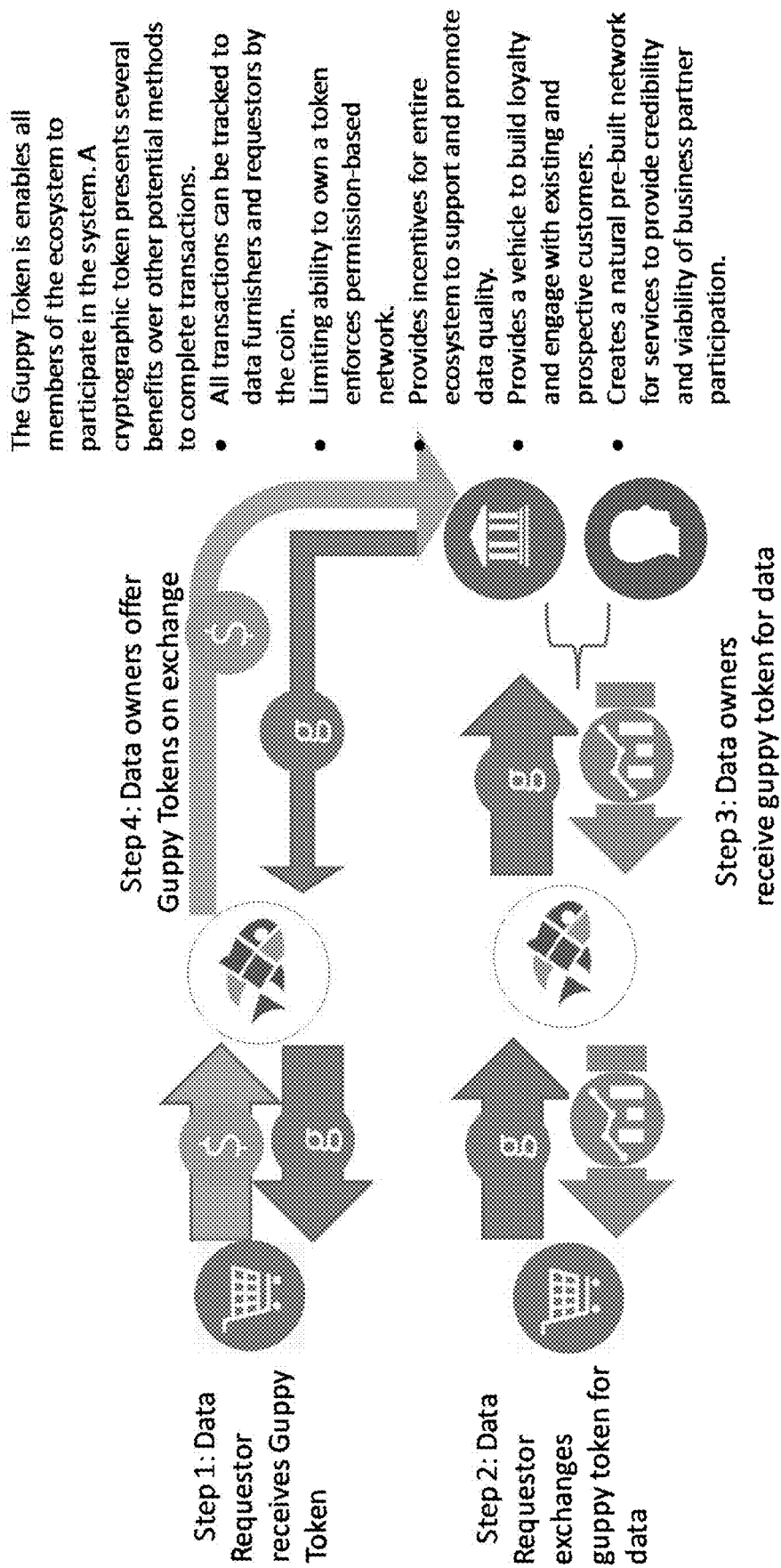
FIG. 7 is a diagram depicting an example process incorporating payment processing.

FIG. 7 depicts a process illustrating payments that may occur in an example embodiment. As shown in FIG. 7, at step 1, a data requestor obtains a form of currency referred to as a guppy token which is used to compensate participants. Any suitable form of currency may be used. At step 2, the data requestor exchanges the guppy token for data that is being managed and coordinated in a coordinating system 110. At step 3, the owner of the data, which may be the data counterparty, receives all or a portion of the guppy token provided by the data requestor. At step 4, the data owner or data counterparty may exchange the guppy token for other forms of currency. It will be appreciated that a cryptographic currency such as a guppy token enables all participants in the system to receive remuneration. It also facilitates other aspects including, for example: all transactions may be tracked to data suppliers and requestors using the token; limiting the ability to own a token enforces a permission-based network; incentivizes an ecosystem to support and promote data quality; provides a vehicle to build loyalty; and creates a network for services to provide credibility and viability.

Dispute Resolution

Figure 8:
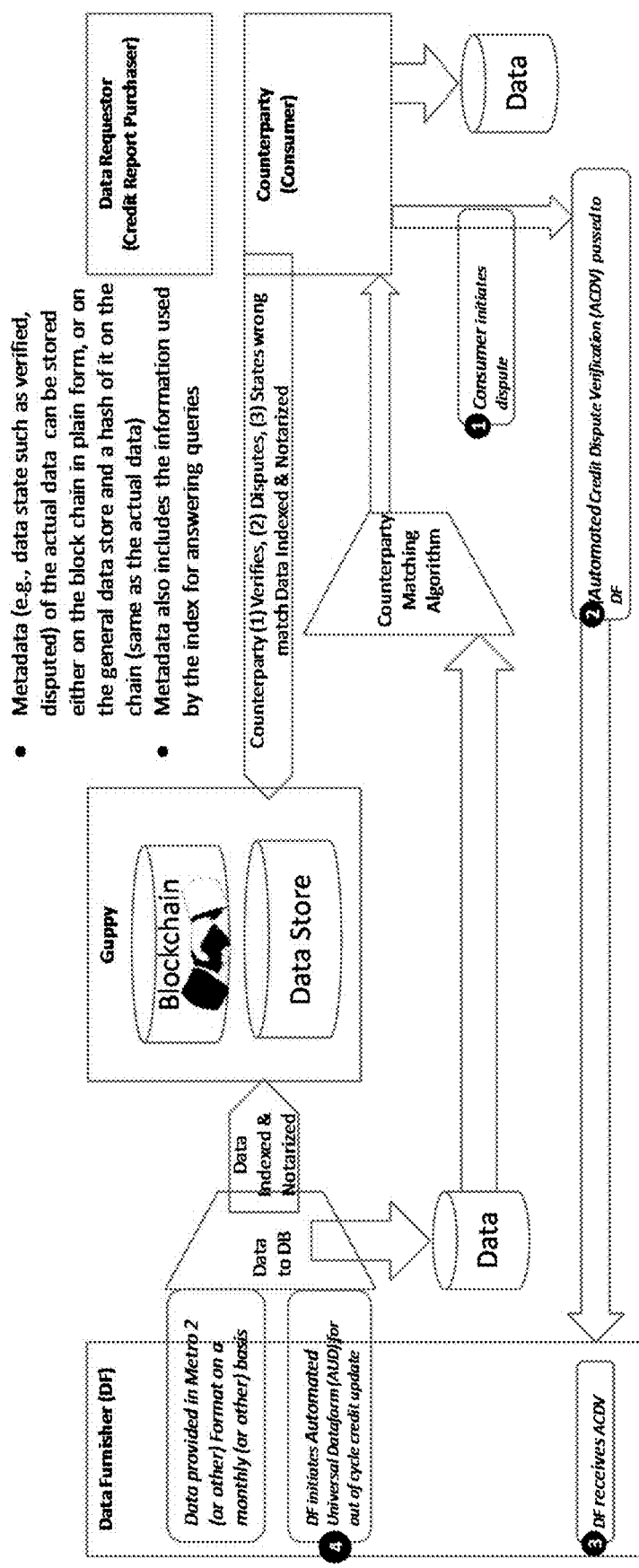
FIG. 8 is a diagram illustrating example processing during data intake and verification.

When a counterparty at counterparty system 140 contests or disputes data that a data furnisher 120 has proposed to add to coordinating system 110, the dispute may be resolved by sending notification of the dispute from the counterparty to the data furnisher as depicted in FIG. 8. In an example embodiment, communicating a dispute may involve data coordinating smart contract 114E receiving notification of the dispute from counterparty smart contract 114C. Data coordinating smart contract 114E generates and sends a dispute indication to the data furnisher smart contract 114A. The dispute indication may comprise an identifier that allows data furnisher smart contract 114A to map the original information that was furnished. In an alternate example, the dispute indication may comprise the disputed data itself. Resolution of the dispute may involve communication between the parties, which may take place either directly outside of system 110 or via system 110. When a resolution between the participants is reached, the data furnisher system 120 sends an indication of the data as revised per resolution of the dispute to the data coordinating system 110. The data may be submitted in a manner similar to the original data. In an example embodiment, the data may be submitted as an automated universal data form (AUD). In response to the submission, data coordinating system smart contract 114E resumes processing of the data, the status of which is revised as shown in FIG. 6 to reflect the resolution of the conflict. The data item may comprise new details and/or corrections. In the circumstance that resolution of the dispute involves identifying the data belongs to a different counterparty, database 112 is updated to reflect the change in the counterparty to which the data relates. If the furnisher of the data and the counterparty do not come to agreement as to the disputed data, the data may remain in a disputed state and may be designated as such within the system.

Data furnisher system 120 may choose to cache identity resolution requests in order to avoid the delay and cost of resolving disputes. In an example embodiment, a request to resolve a dispute may have an associated time to live (TTL) for resolution results, or resolution results are guaranteed stable for some constant period after which the data furnisher system 120 must periodically check the cache values are still valid. Data furnisher system 120 may apply caching at any point in its processing that may be useful. For example, caching may be used in the initial step of furnishing data to data coordinating system 110.

Data Access Review

In some instances, a counterparty may wish to grant access to or revoke access of a data requestor. In an example embodiment, data coordinating smart contract 114E may determine that data submitted by a data furnisher 120 matches a profile maintained in database 112 for a customer. In response, data coordinating smart contract 114E may send a message to counterparty smart contract 114C. The message may comprise an identifier which may be a hash of the data and/or an address of the data requestor 130.

The counterparty contract 114C interfaces with counterparty system 140 to present the data requestor and the requested data to the counterparty. An address for the data requestor 130 may be used to retrieve information about the data requestor system 130. The data hash may be used to retrieve details regarding the data item. Counterparty system 140 receives input designating whether or not the counterparty approves sharing the particular data with the requesting data requestor. If a counterparty grants the data requestor access to the requested data, the counterparty may also specify that the same data requestor be given permission to access data in the future. Counterparty system 140 communicates an indication of whether the permission has been granted or denied to counterparty smart contract 114C. Counterparty smart contract 114C communicates the selection to the data coordinating smart contract 114E. Data coordinating smart contract 114E updates database 112 to indicate the counterparty's selection to grant or deny the particular data requestor system 130 with access to the particular data. Data coordinating smart contract 114E communicates data to the data requestor, where the data may or may not include the data from the counterparty depending upon the election by the counterparty. If access to data was granted by counterparty contract 114C, data coordinating smart contract 114E updates database 112 to reflect that the data requestor 130 accessed the data.

Data coordinating database 112 is updated to record each access of data that is stored in or for which access is coordinated by system 110. The identity of the individual, entity, and/or system that accessed the data is recorded along with the date and time of the access. Counterparty system 140 may communicate with counterparty smart contract 114C to retrieve data regarding the data requestors that have accessed its data. The data coordinating smart contract 114E may retrieve from database 112 a log of accesses made to the customer's data during a prescribed time frame. The data is communicated through system 110 to counterparty system 140.

Data Browsing and Selection

Figure 18:
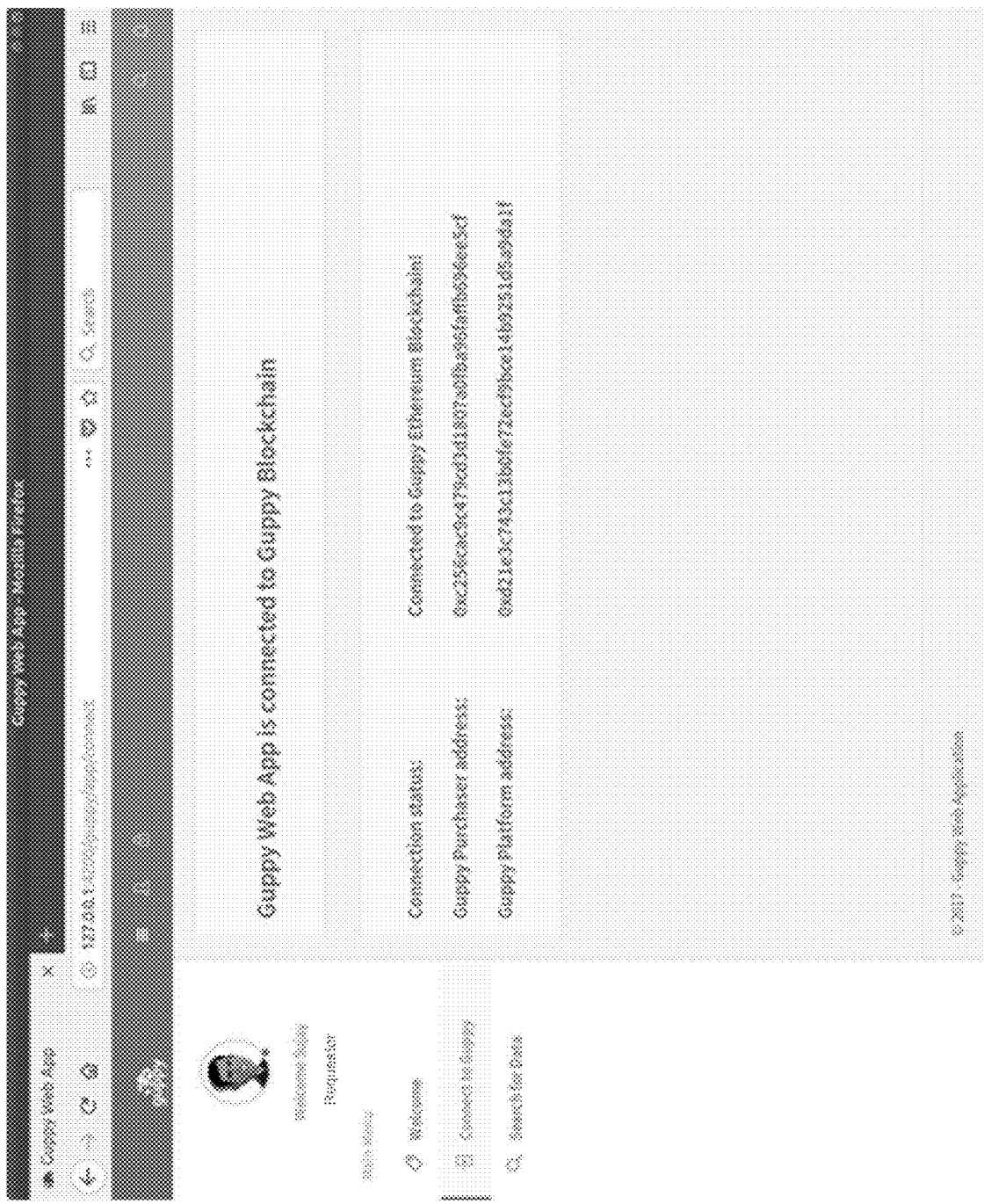
FIG. 18 depicts an example user interface.
Figure 19:
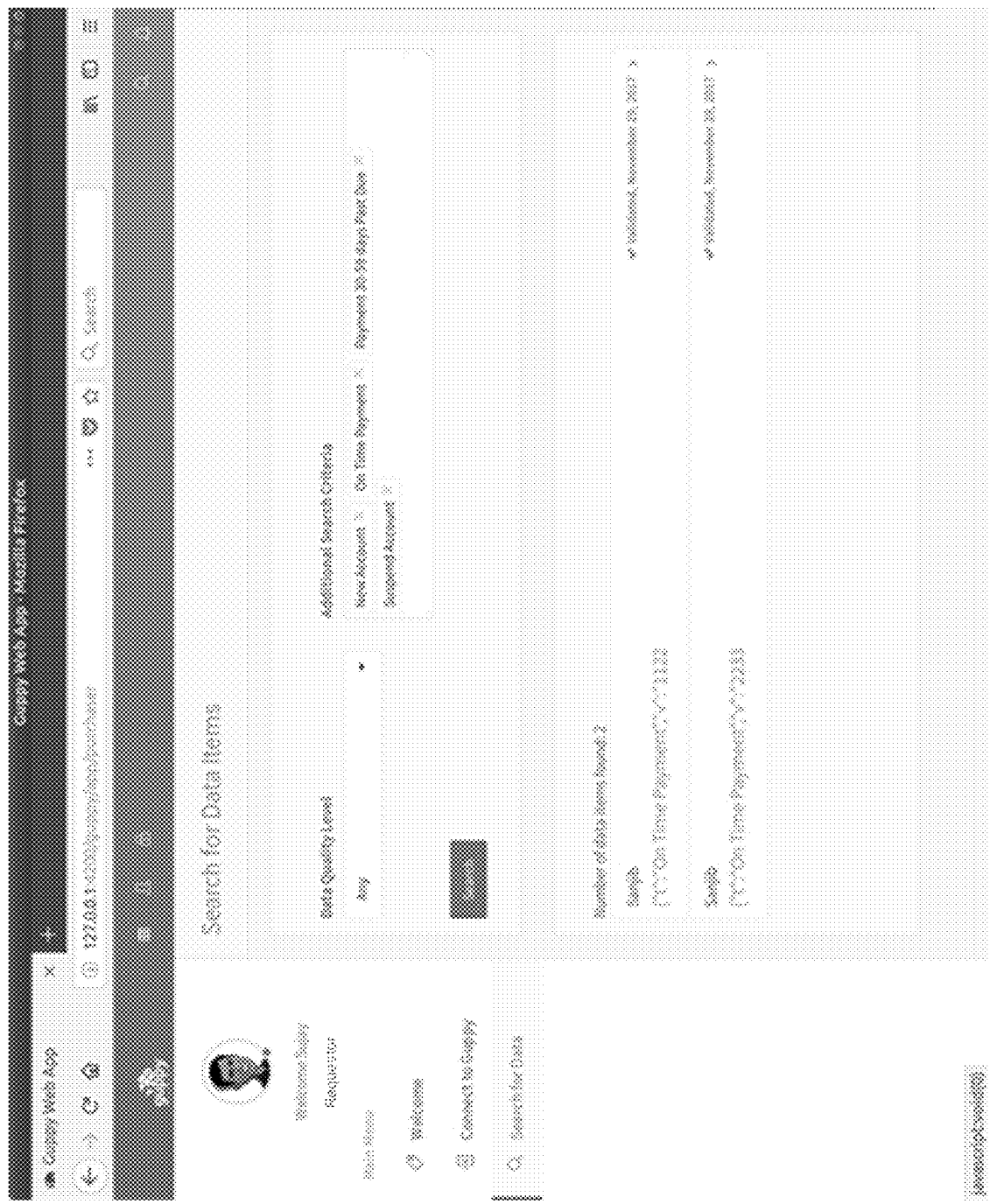
FIG. 19 depicts an example user interface.
Figure 20:
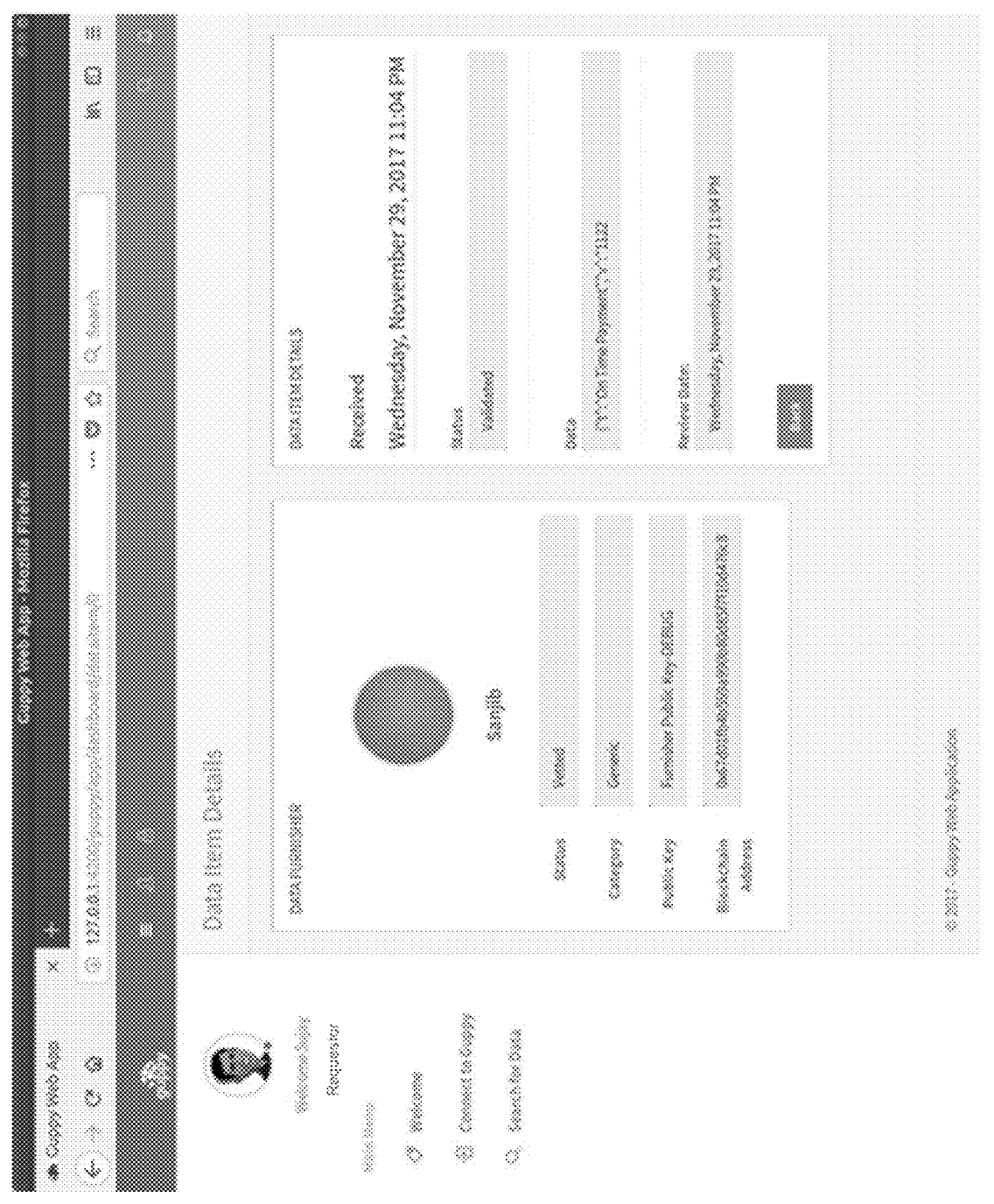

Data requestor system 130 may be programmed to review data that is available for purchase. In the instance that the data requestor system 130 connects to data coordinating system 110, data requestor system 130 may generate a user interface such as illustrated in FIG. 18. The interface may identify the contracts to which the requestor system 130 may communicate. The operator of data requestor system 130 may browse to another interface such as depicted in FIG. 19 which allows for entering search criteria. In an example embodiment, data requestor system 130 may communicate a request to review data to data requestor smart contract 114B, which communicates the request to data coordinating smart contract 114E. The request may specify criteria to be used in searching for data. Data coordinating smart contract 114E initiates a search of database 112 for data matching the specified criteria. The results of the query are received at data coordinating smart contract 114E and communicated through smart contract 114B to data requestor system 130. An example interface such as depicted in FIG. 20 may be generated and presented at data requestor system 130 with which the data requestor may review the data satisfying his or her search criteria. The level of detail displayed may be subject to permissions granted by the counterparty and/or data furnisher. In an example embodiment, the query results may be in summary form and may specify, for example, an approximation of the number of data items that satisfy the data selection criteria, a period to which the data apply, a geographical area covered, and price for reviewing the actual data. In an example embodiment, the actual data may not be made available until payment, which may be in the form of digital currency, is received.

The operator of data requestor system 130 may elect to receive some or all the data specified in the summary data. Data requestor system 130 may receive entry of payment of the specified amount and communicate the request and payment information to data requestor smart contract 114B, which communicates the request to data coordinating smart contract 114E. Data coordinating smart contract 114E communicates a request for data specifics to database 112. Database 112 returns the relevant data to data coordinating smart contract 114E which retrieves and uses the public key associated with data requestor system 130 to encrypt the data query results. Data coordinating smart contract 114E communicates notification to data requestor smart contract 114B that the data is available for retrieval at a particular location or address. Data requestor smart contract 114B communicates the location of the encrypted data to the data requestor system 130. The data requestor system 130 may retrieve the data and use its private key to decrypt the data.

In an example embodiment, system 110 allows a data requestor to rate the quality of data that is provided in response to a query. Data requestor system 130 may communicate a message providing feedback regarding received data to data requestor smart contract 114B. The feedback may specify the quality of the results of a particular query as a whole, and/or specify the quality of specific data item amongst the results. The message may identify the data to which the feedback is associated by specifying an identifier associated with the query that generated the query results as well as by identifying specific data items. Data requestor smart contract 114B communicates the feedback to data coordinating smart contract 114E. The data coordinating smart contract 114E stores the feedback in database 112 in relation to the data to which it corresponds.

Alternative Architecture

Figure 9:
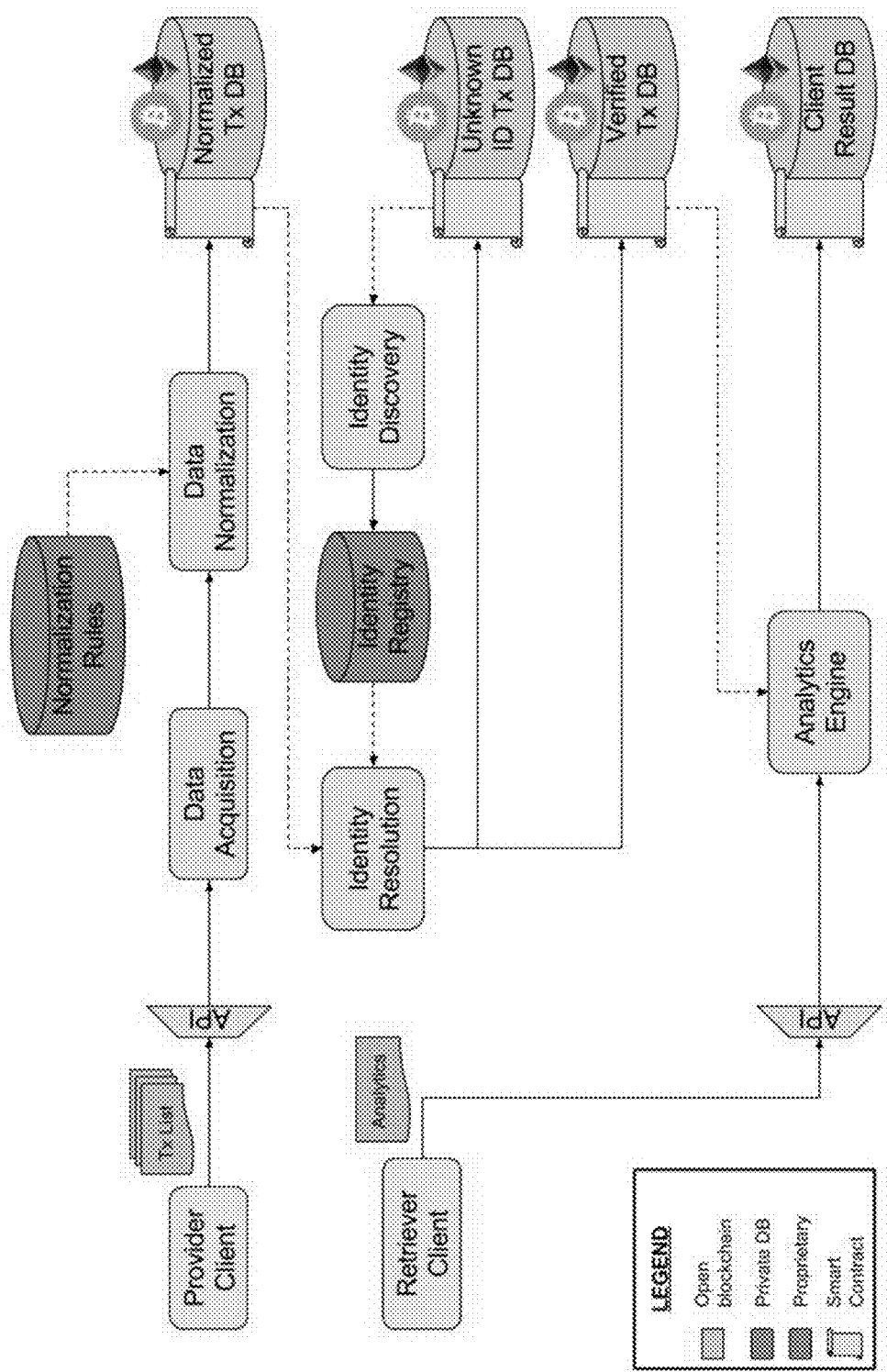
FIG. 9 is a diagram illustrating an example system architecture.

Alternative architectures may be used to implement a system for providing distributed data management and verification. FIG. 9 is a diagram showing dataflows in an example alternative architecture. The depicted dataflows cover data on-boarding and data analytics. For on-boarding, raw data provided by clients may be submitted via an APIs. If necessary, the data may be staged in the "Data Acquisition" module in case it is submitted in parts, before further processing. The data may be sanitized and normalized using proprietary domain and source-specific methods. The processing may be performed as per rules, or may be performed using a complex workflow which may involve calls to external systems. The cleansed, normalized data is used for further processing.

In an embodiment that employs block chain technology, identities are associated with a private/public key pair. Authorization and authentication rely on presenting the appropriate private key(s). The disclosed data coordinating platform will therefore need to map user identifiers in the submitted data (which has no reference to Blockchain or an entity's keys) to Blockchain entities for the purposes of signing the data. The data coordinating platform maintains a private "Identity registry" which allows the system to associate identifiers in the normalized data to known users of the system (and from there to their Blockchain-specific credentials). This mapping is carried out by an "Identity resolution" module. The "Identity resolution" module is not only responsible for identifying known entities in the data but also interacting with them (or their "wallets") in order to verify (attest) the input data. Once verified, the data can be kept in a special "Verified Data" repository. In some instances, there may be transactions that either cannot be mapped to known entities or where the mapping is ambiguous. These will be recorded in an "Unknown ID" repository and may result in an "Identity Discovery" workflow to resolve the ambiguities. This may lead to revisions in the "Identity Registry" and once new identities are resolved, more transactions may be move into the "Verified" repository. Not shown in the figure for brevity is the workflow for transactions that are associated with known entities but are rejected by those entities as invalid or fraudulent. These transactions may need to be further analyzed or else result in notifications to the originator of the data.

The "Verified" repository is made available to external entities for purposes such as lending or targeted marketing. To facilitate this use case, the data coordinating system provides APIs for such customers of the platform (called "Retrievers") to submit their desired analytics written against a retriever API (to be designed). The analytics are submitted with cryptographic proof that the submitter has authorization to access the desired data. An analytics engine validates the analytics and executes them efficiently against the verified transactions in bulk.

The data coordinating play may also provide APIs for customers whose data is in the "Verified" repository to access their information at their convenience. This processing may include obtaining information about how often their data was used and for which purpose.

It will be appreciated that while the figure shows a collection of "public" repositories in the architecture, this is a conceptual partitioning. The system may use one (or more) physical blockchain systems, and if appropriate, it may even be implemented as separate states of the same "object" (as in the Ethereum Solidity smart contracts).

Example Computing Architecture

Figure 21:
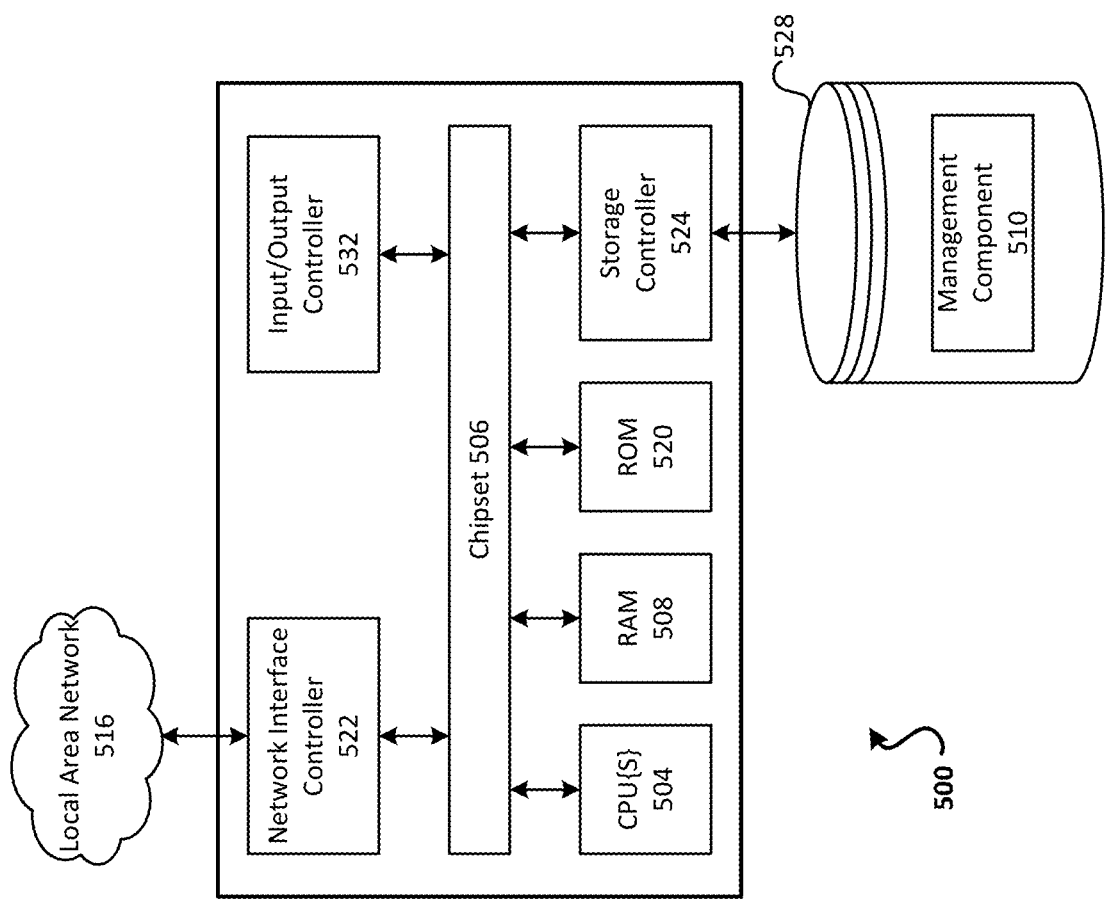
FIG. 21 depicts an example computing system.

FIG. 21 depicts an example computer architecture for a computing system 500 capable of executing software for performing operations as described above in connection with FIGS. 1-20. The computer architecture shown in FIG. 21 illustrates a conventional server computer, workstation, desktop computer, laptop, tablet, network appliance, PDA, e-reader, digital cellular phone, or other computing node, and may be utilized to execute any aspects of the software components presented herein described as executing on systems 110, 112, 114A-E, 120, 130, 140, and 150, or on any other computing system mentioned herein.

Computer 500 may include a baseboard, or "motherboard," which is a printed circuit board to which a multitude of components or devices may be connected by way of a system bus or other electrical communication paths. One or more central processing units (CPUs) 504 may operate in conjunction with a chipset 506. CPUs 504 may be standard programmable processors that perform arithmetic and logical operations necessary for the operation of computer 500.

CPUs 504 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 506 may provide an interface between CPUs 504 and the remainder of the components and devices on the baseboard. Chipset 506 may provide an interface to a random-access memory (RAM) 508 used as the main memory in computer 500. Chipset 506 may further provide an interface to a computer-readable storage medium, such as a read-only memory (ROM) 520 or non-volatile RAM (NVRAM) (not shown), for storing basic routines that may help to start up computer 500 and to transfer information between the various components and devices. ROM 520 or NVRAM may also store other software components necessary for the operation of computer 500 in accordance with the embodiments described herein.

Computer 500 may operate in a networked environment using logical connections to remote computing nodes and computer systems through LAN 516. Chipset 506 may include functionality for providing network connectivity through a network interface controller (NIC) 522, such as a gigabit Ethernet adapter. NIC 522 may be capable of connecting the computer 500 to other computing nodes over LAN 516. It should be appreciated that multiple NICs 522 may be present in computer 500, connecting the computer to other types of networks and remote computer systems.

Computer 500 may be connected to a mass storage device 528 that provides non-volatile storage for the computer. Mass storage device 528 may store system programs, application programs, other program modules, and data, which have been described in greater detail herein. Mass storage device 528 may be connected to computer 500 through a storage controller 524 connected to chipset 506. Mass storage device 528 may consist of one or more physical storage units. Storage controller 524 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 500 may store data on mass storage device 528 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 528 is characterized as primary or secondary storage and the like.

For example, computer 500 may store information to mass storage device 528 by issuing instructions through storage controller 524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 500 may further read information from mass storage device 528 by detecting the physical states or characteristics of one or more particular locations within the physical storage units.

In addition to mass storage device 528 described above, computer 500 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 500.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

Mass storage device 528 may store an operating system utilized to control the operation of the computer 500. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 528 may store other system or application programs and data utilized by computer 500, such as management component 510 and/or the other software components described above.

Mass storage device 528 or other computer-readable storage media may also be encoded with computer-executable instructions, which, when loaded into computer 500, transforms the computer from a general-purpose computing system into a special-purpose computer capable of implementing the embodiments described herein. These computer-executable instructions transform computer 500 by specifying how CPUs 504 transition between states, as described above. Computer 500 may have access to computer-readable storage media storing computer-executable instructions, which, when executed by computer 500, may perform operating procedures described above in connection with FIGS. 1-20.

Computer 500 may also include an input/output controller 532 for receiving and processing input from a number of input devices, such as a keyboard, a mouse, a touchpad, a touch screen, an electronic stylus, or other type of input device. Similarly, input/output controller 532 may provide output to a display, such as a computer monitor, a flat-panel display, a digital projector, a printer, a plotter, or other type of output device. It will be appreciated that computer 500 may not include all of the components shown in FIG. 21, may include other components that are not explicitly shown in FIG. 21, or may utilize an architecture completely different than that shown in FIG. 21.

Accordingly, systems and methods have been described that provide for distributed data management and verification. The described systems allow for data to be owned and managed by individual participants who make their data available to others using the data coordinating system. Counterparties are given the opportunity to review and verify data relevant to them, and to dispute data that is believed to be inaccurate. Counterparty also have the capability to grant and deny access to their data.

It will be appreciated that while the example embodiments are described in connection with data relating to financial transactions, the intended embodiments extend to coordinating data of all types including, for example, data relating to personal health and healthcare transactions.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

It will be appreciated that while illustrative embodiments have been disclosed, the scope of potential embodiments is not limited to those explicitly described. For example, while the concepts are described with reference to requests received to perform particular types of functions or commands, the envisioned embodiments extend to processing involving any and all types of functions and commands. Similarly, while the concepts are described with reference to particular protocols and formats, the envisioned embodiments extend to processing involving any and all types of protocols and formats.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A method for data management, comprising:
receiving, by a first computing agent associated with a data furnisher system, data;
storing the received data and an indication that the received data is unverified;
identifying, by a second computing agent associated with a data coordinating system, a person to whom the received data relates;
identifying, by the second computing agent associated with the data coordinating system, a third computing agent associated with a system for the identified person;
communicating, by the third computing agent associated with the system for the identified person, an indication to the identified person that the received data is available for review;
receiving, by the third computing agent associated with the system for the identified person, an indication that the received data is verified by the identified person;
storing the indication that the received data is verified;
communicating to the first computing agent associated with the data furnisher system the indication that the received data is verified;
communicating, by the third computing agent associated with the system for the identified person, to the first computing agent associated with the data furnisher system, a message to change status of the received data; and
communicating, by the first computing agent associated with the data furnisher system, the indication that the received data is verified to the second computing agent associated with the data coordinating system.

2. The method of claim 1, wherein the received data comprises a reference to a location of data stored on the data furnisher system.

3. The method of claim 1, wherein communicating an indication that the received data is available for review comprises communicating the received data.

4. The method of claim 1, wherein communicating an indication that the received data is available for review comprises communicating a reference to a location of the received data.

5. The method of claim 4, further comprising:
receiving, by the third agent associated with the system for the identified person, the reference to the location of the received data;
retrieving, by the third agent associated with the system for the identified person, the received data using the reference to the location of the received data; and
communicating, by the third agent associated with the system for the identified person, the received data.

6. The method of claim 5, wherein communicating the received data comprises communicating data encrypted using a public encryption key associated with the system for the identified person.

7. The method of claim 1, wherein the received data comprises a hash of data and an identity of the person to whom the received data relates, the identity of the person encrypted using a public key corresponding to a smart contract associated with the data coordinating system.

8. The method of claim 7, wherein identifying a person to whom the data relates comprises decrypting the received data using a private key corresponding to the smart contract associated with the data coordinating system.

9. The method of claim 1, further comprising:
encrypting the received data with a public key associated with the system for the identified person.

10. The method of claim 1, further comprising:
identifying, by the second computing agent associated with the data coordinating system, stored data that matches a data requestor profile associated with a data request;
communicating, by the second computing agent associated with the data coordinating system, to the third computing agent associated with the system for the identified person, an identification of a data requestor and an identification of the stored data that matches the data request;
communicating, by the third computing agent to the system for the identified person, an indication of the data requestor and an indication of the stored data that matches a profile of data associated with the data request;
receiving, by the third computing agent associated with the system for the identified person, an indication of whether to grant or deny access to the stored data to the data requestor;
communicating, by the third computing agent associated with the system for the identified person to the second computing agent, the indication of whether to grant or deny access to the stored data to the data requestor; and
storing, by the second computing agent associated with the data coordinating system, the indication of whether to grant or deny access to the stored data to the data requestor.

11. A method for data management, comprising:
receiving, by a first computing agent associated with a data furnisher system, data;
storing the received data and an indication that the received data is unverified;
identifying, by a second computing agent associated with a data coordinating system, a person to whom the received data relates;
identifying, by the second computing agent associated with the data coordinating system, a third computing agent associated with a system for the identified person;
communicating, by the third computing agent associated with the system for the identified person, an indication to the identified person that the received data is available for review;
receiving, by the third computing agent associated with the system for the identified person, an indication that the received data is verified by the identified person;
storing the indication that the received data is verified;
receiving, by the first computing agent associated with the data furnisher system, second data;
storing the received second data and an indication that the received second data is unverified;
identifying, by the second computing agent associated with the data coordinating system, the received second data relates to the identified person;
identifying, by the second computing agent associated with the data coordinating system, the third computing agent associated with the system for the identified person;
communicating, by the third computing agent associated with the system for the identified person, an indication to the identified person that the received second data is available for review;
receiving, by the third computing agent associated with the system for the identified person, an indication that the received second data is disputed;
communicating, by the third computing agent associated with the system for the identified person, to the second computing agent associated with the data coordinating system, the indication that the received second data is disputed;
storing the indication that the received second data is disputed;
communicating, by the second computing agent associated with the data coordinating system, to the first computing agent associated with the data furnisher system, the indication that the received second data is disputed; and
communicating, by the first computing agent associated with the data furnisher system, to the data furnisher system, the indication that the received second data is disputed.

12. The method of claim 11, further comprising:
receiving, by the second computing agent associated with the data coordinating system, an indication that a dispute regarding the received second data is resolved;
receiving, by the second computing agent associated with the data coordinating system, revised second data; and
storing the revised second data and an indication that the dispute has been resolved.

13. A method for data management, comprising:
receiving, by a first computing agent associated with a data furnisher system, data;
storing the received data and an indication that the received data is unverified;
identifying, by a second computing agent associated with a data coordinating system, a person to whom the received data relates;
identifying, by the second computing agent associated with the data coordinating system, a third computing agent associated with a system for the identified person;
communicating, by the third computing agent associated with the system for the identified person, an indication to the identified person that the received data is available for review;

receiving, by the third computing agent associated with the system for the identified person, an indication that the received data is verified by the identified person;
storing the indication that the received data is verified;
receiving, by the first computing agent associated with the data furnisher system, second data;
storing the received second data and an indication that the received second data is unverified;
identifying, by the second computing agent associated with the data coordinating system, that the received second data relates to the identified person;
identifying, by the second computing agent associated with the data coordinating system, the third computing agent associated with the system for the identified person;
communicating, by the third computing agent associated with the system for the identified person, an indication to the identified person that the received second data is available for review;
receiving, by the third computing agent associated with the system for the identified person, an indication that the received second data is not verified and is not disputed;
communicating, by the third computing agent associated with the system for the identified person, to the second computing agent associated with the data coordinating system, the indication that the received second data is not verified and is not disputed;
storing the indication that the received second data is not verified and is not disputed;
communicating, by the second computing agent associated with the data coordinating system, to the first computing agent associated with the data furnisher system, the indication that the received second data is not verified and is not disputed; and
communicating, by the first computing agent associated with the data furnisher system, to the data furnisher system, the indication that the received second data is not verified and is not disputed.

14. A system for data management, comprising:
a computing processor; and
computing memory communicatively coupled with the computing processor, the computing memory having executable instructions stored thereon that upon execution cause the system to perform operations comprising:
  receiving, by a first computing agent associated with a data furnisher system, data;
  storing the received data and an indication that the received data is unverified;
  identifying, by a second computing agent associated with a data coordinating system, a person to whom the received data relates;
  identifying, by the second computing agent associated with the data coordinating system, a third computing agent associated with a system for the identified person;
  communicating, by the third computing agent associated with the system for the identified person, an indication to the identified person that the received data is available for review;
  receiving, by the third computing agent associated with the system for the identified person, an indication that the received data is verified by the identified person;
  storing the indication that the received data is verified; and
  communicating to the first computing agent associated with the data furnisher system the indication that the received data is verified;
  communicating, by the third computing agent associated with the system for the identified person, to the first computing agent associated with the data furnisher system, a message to change status of the received data; and
  communicating, by the first computing agent associated with the data furnisher system, the indication that the received data is verified to the second computing agent associated with the data coordinating system.

15. The system of claim 14, wherein communicating an indication that the received data is available for review comprises communicating a reference to a location of the received data.

16. The system of claim 15, the computing memory having executable instructions stored thereon that upon execution cause the system to perform operations further comprising:
  receiving, by the third agent associated with the system for the identified person, the reference to the location of the received data;
  retrieving, by the third agent associated with the system for the identified person, the received data using the reference to the location of the received data; and
  communicating, by the third agent associated with the system for the identified person, the received data.

17. The system of claim 14, the computing memory having executable instructions stored thereon that upon execution cause the system to perform operations further comprising:
  identifying, by the second computing agent associated with the data coordinating system, stored data that matches a data requestor profile associated with a data request;
  communicating, by the second computing agent associated with the data coordinating system, to the third computing agent associated with the system for the identified person, an identification of a data requestor and an identification of the stored data that matches the data request;
  communicating, by the third computing agent to the system for the identified person, an indication of the data requestor and an indication of the stored data that matches a profile of data associated with the data request;
  receiving, by the third computing agent associated with the system for the identified person, an indication of whether to grant or deny access to the stored data to the data requestor;
  communicating, by the third computing agent associated with the system for the identified person to the second computing agent, the indication of whether to grant or deny access to the stored data to the data requestor; and
  storing, by the second computing agent associated with the data coordinating system, the indication of whether to grant or deny access to the stored data to the data requestor.

18. A system for data management comprising:
a computing processor; and
computing memory communicatively coupled with the computing processor, the computing memory having executable instructions stored thereon that upon execution cause the system to perform operations comprising:

receiving, by a first computing agent associated with a data furnisher system, data;
storing the received data and an indication that the received data is unverified;
identifying, by a second computing agent associated with a data coordinating system, a person to whom the received data relates;
identifying, by the second computing agent associated with the data coordinating system, a third computing agent associated with a system for the identified person;
communicating, by the third computing agent associated with the system for the identified person, an indication to the identified person that the received data is available for review;
receiving, by the third computing agent associated with the system for the identified person, an indication that the received data is verified by the identified person;
storing the indication that the received data is verified;
receiving, by the first computing agent associated with the data furnisher system, second data;
storing the received second data and an indication that the received second data is unverified;
identifying, by the second computing agent associated with the data coordinating system, that the received second data relates to the identified person;
identifying, by the second computing agent associated with the data coordinating system, the third computing agent associated with the system for the identified person;
communicating, by the third computing agent associated with the system for the identified person, an indication to the identified person that the received second data is available for review;
receiving, by the third computing agent associated with the system for the identified person, an indication that the received second data is disputed;
communicating, by the third computing agent associated with the system for the identified person, to the second computing agent associated with the data coordinating system, the indication that the received second data is disputed;
storing the indication that the received second data is disputed;
communicating, by the second computing agent associated with the data coordinating system, to the first computing agent associated with the data furnisher system, an indication that the received second data is disputed; and
communicating, by the first computing agent associated with the data furnisher system, to the data furnisher system, the indication that the received second data is disputed.

19. The system of claim 18, the computing memory having executable instructions stored thereon that upon execution cause the system to perform operations further comprising:
receiving, by the second computing agent associated with the data coordinating system, an indication that a dispute regarding the received second data is resolved;
receiving, by the second computing agent associated with the data coordinating system, revised second data; and
storing the revised second data and the indication that the dispute has been resolved.

20. A system for data management comprising:
a computing processor;
computing memory communicatively coupled with the computing processor, the computing memory having executable instructions stored thereon that upon execution cause the system to perform operations comprising:
receiving, by a first computing agent associated with a data furnisher system, data;
storing the received data and an indication that the received data is unverified;
identifying, by a second computing agent associated with a data coordinating system, a person to whom the received data relates;
identifying, by the second computing agent associated with the data coordinating system, the third computing agent associated with a system for the identified person;
communicating, by the third computing agent associated with the system for the identified person, an indication to the identified person that the received data is available for review;
receiving, by the third computing agent associated with the system for the identified person, an indication that the received data is verified by the identified person;
storing the indication that the received data is verified;
receiving, by the first computing agent associated with the data furnisher system, second data;
storing the received second data and an indication that the received second data is unverified;
identifying, by the second computing agent associated with the data coordinating system, that the received second data relates to the identified person;
identifying, by the second computing agent associated with the data coordinating system, a third computing agent associated with the system for the identified person;
communicating, by the third computing agent associated with the system for the identified person, an indication to the identified person that the received second data is available for review;
receiving, by the third computing agent associated with the system for the identified person, an indication that the received second data is not verified and is not disputed;
communicating, by the third computing agent associated with the system for the identified person, to the second computing agent associated with the data coordinating system, the indication that the received second data is not verified and is not disputed;
storing the indication that the received second data is not verified and is not disputed;
communicating, by the second computing agent associated with the data coordinating system, to the first computing agent associated with the data furnisher system, the indication that the received second data is not verified and is not disputed; and
communicating, by the first computing agent associated with the data furnisher system, to the data furnisher system, the indication that the received second data is not verified and is not disputed.

* * * * *